(12) United States Patent
Ahn et al.

(10) Patent No.: US 12,248,338 B2
(45) Date of Patent: Mar. 11, 2025

(54) DISPLAY APPARATUS

(71) Applicants:Samsung Display Co., LTD., Yongin-si (KR); INDUSTRY-ACADEMIC COOPERATION FOUNDATION, YONSEI UNIVERSITY, Seoul (KR)

(72) Inventors: Jaeho Ahn, Asan-si (KR); Taewoong Kim, Seongnam-si (KR); Jong-Hyun Ahn, Seoul (KR); Beomjin Kim, Seoul (KR); Heechang Shin, Goyang-si (KR); Jinyeong Choe, Siheung-si (KR)

(73) Assignees: Samsung Display Co., Ltd., Yongin-si (KR); Industry-Academic Cooperation Foundation, Yonsei University, Seoul (KR)

( * ) Notice: Subject to any disclaimer, the term of this patent is extended or adjusted under 35 U.S.C. 154(b) by 219 days.

(21) Appl. No.: 18/105,738

(22) Filed: Feb. 3, 2023

(65) Prior Publication Data

US 2023/0259170 A1    Aug. 17, 2023

(30) Foreign Application Priority Data

Feb. 11, 2022    (KR) ........................ 10-2022-0018423

(51) Int. Cl.
   *G06F 1/16*    (2006.01)
(52) U.S. Cl.
   CPC .......... *G06F 1/1656* (2013.01); *G06F 1/1652* (2013.01)
(58) Field of Classification Search
   CPC combination set(s) only.
   See application file for complete search history.

(56) References Cited

U.S. PATENT DOCUMENTS

| | | | | |
|---|---|---|---|---|
| 10,743,427 | B2 * | 8/2020 | Huang | G06F 1/1626 |
| 11,233,224 | B2 * | 1/2022 | Eom | H10K 50/84 |
| 11,281,321 | B2 * | 3/2022 | Choi | G06F 3/0446 |
| 11,515,495 | B2 * | 11/2022 | Joo | H10K 59/65 |
| 11,662,780 | B2 * | 5/2023 | Park | G06F 1/1616 |
| | | | | 361/679.01 |
| 11,762,419 | B2 * | 9/2023 | Lee | G06F 1/1652 |
| | | | | 361/679.01 |

(Continued)

FOREIGN PATENT DOCUMENTS

| | | |
|---|---|---|
| CN | 109949706 A | 6/2019 |
| CN | 214541377 U | 10/2021 |

(Continued)

*Primary Examiner* — Lisa Lea-Edmonds
(74) *Attorney, Agent, or Firm* — Womble Bond Dickinson (US) LLP

(57) ABSTRACT

A display apparatus includes: a display panel; a first pattern layer on one surface of the display panel; and a second pattern layer facing the one surface with the first pattern layer interposed therebetween, wherein: the first pattern layer comprises a plurality of first patterns each having a closed line shape comprising a first opening; the second pattern layer comprises a plurality of second patterns each having a closed line shape comprising a second opening; on the one surface, each of the first pattern layer and the second pattern layer has a deformation rate which is smaller in a direction perpendicular to a tensile direction than in the tensile direction; and on the one surface, the first openings overlap portions of the second patterns.

20 Claims, 17 Drawing Sheets

(56) References Cited

U.S. PATENT DOCUMENTS

| | | | |
|---|---|---|---|
| 2020/0159288 A1 | 5/2020 | Song et al. | |
| 2020/0205301 A1 | 6/2020 | Song | |
| 2021/0233447 A1* | 7/2021 | Park | G06F 1/1616 |
| 2022/0085330 A1* | 3/2022 | Yang | H10K 71/233 |
| 2023/0259170 A1* | 8/2023 | Ahn | G06F 1/1652 |
| | | | 361/679.01 |
| 2023/0280798 A1* | 9/2023 | Park | G06F 1/1652 |
| | | | 361/679.01 |
| 2024/0015904 A1* | 1/2024 | Choi | H10K 77/111 |
| 2024/0361802 A1* | 10/2024 | Kim | G06F 1/1652 |

FOREIGN PATENT DOCUMENTS

| | | |
|---|---|---|
| KR | 10-1966787 B1 | 4/2019 |
| KR | 10-2020-0056636 A | 5/2020 |
| KR | 10-2020-0076103 A | 6/2020 |

\* cited by examiner

DISPLAY APPARATUS

CROSS-REFERENCE TO RELATED APPLICATIONS

This application claims priority to and the benefit of Korean Patent Application No. 10-2022-0018423, filed on Feb. 11, 2022, in the Korean Intellectual Property Office, the entire contents of which are hereby incorporated by reference.

BACKGROUND

1. Field

Aspects of some embodiments of the present disclosure herein relate to a display apparatus.

2. Description of the Related Art

Electronic devices such as smart phones, digital cameras, notebook computers, computers, navigation systems, and smart televisions, which display images to users, may include a display apparatus for displaying images. With technological development in recent years, various types of display apparatuses have been developed. For example, various flexible display apparatuses, which can be flexed into a curved, folded, or rolled shape, are being developed. Flexible display apparatuses may be generally easier to carry and, therefore, the convenience for users may be improved.

A flexible display apparatus may require improvement in flexibility to be easily folded or rolled, and for this reason, the flexible display apparatus may be relatively vulnerable to damage due to external impacts. In addition, when the flexible display apparatus is folded or rolled, the surface quality of the display apparatus may deteriorate over time depending on the internal configuration of the display apparatus.

The above information disclosed in this Background section is only for enhancement of understanding of the background and therefore the information discussed in this Background section does not necessarily constitute prior art.

SUMMARY

Aspects of some embodiments of the present disclosure herein relate to a display apparatus, and for example, to a rollable display apparatus.

Aspects of some embodiments of the present disclosure include a display apparatus having improved impact resistance as well as improved surface quality.

Aspects of some embodiments of the inventive concept include a display apparatus including a display panel; a first pattern layer on one surface of the display panel; and a second pattern layer facing the one surface with the first pattern layer interposed therebetween. The first pattern layer may include first patterns each having a closed line shape including a first opening, and the second pattern layer may include second patterns each having a closed line shape including a second opening. On the one surface, each of the first pattern layer and the second pattern layer may have a deformation rate which is smaller in a direction perpendicular to a tensile direction than in the tensile direction, and the first openings may overlap portions of the second patterns.

According to some embodiments, each of the first pattern layer and the second pattern layer may have a negative Poisson's ratio.

According to some embodiments, the first patterns may have a shape different from that of the second patterns.

According to some embodiments, the first patterns may have the same shape as the second patterns.

According to some embodiments, each of the first patterns may be engaged with and connected to adjacent first patterns.

According to some embodiments, a portion in which the first patterns are engaged with each other may include a curve.

According to some embodiments, the shapes of the first patterns that are engaged with and connected to each other may be identical to each other.

According to some embodiments, a shape of one of the first patterns engaged with and connected to each other may correspond to a shape obtained by rotating a first pattern connected to the one first pattern at a predetermined angle.

According to some embodiments, the first patterns may include a polygonal pattern and line portions extending from the polygonal pattern, and the first patterns adjacent to each other may be connected by the line portions of the first patterns.

According to some embodiments, the display apparatus may further include: a first resin layer between the first pattern layer and the display panel; and a second resin layer between the first pattern layer and the second pattern layer.

According to some embodiments, the modulus of each of the first pattern layer and the second pattern layer may be greater than the modulus of each of the first resin layer and the second resin layer.

According to some embodiments, the first resin layer may be inside the first openings, and the second resin layer may be inside the second openings.

According to some embodiments, the first resin layer may be spaced apart from the second pattern layer with the first pattern layer interposed therebetween.

According to some embodiments, the display apparatus may further include a plurality of support bars, which face the one surface of the display panel with the first and second pattern layers interposed therebetween, are arranged in one direction, and respectively extend in a direction crossing the one direction.

According to some embodiments of the inventive concept, a display apparatus includes a display panel that is rolled around a rolling axis; and a protective member on one surface of the display panel, wherein: the protective member includes a plurality of pattern layers arranged along a thickness direction of the display panel and respectively including auxetic patterns; and the auxetic patterns of at least two of the plurality of pattern layers are displaced from each other on a plane.

According to some embodiments, each of the plurality of pattern layers may have a Poisson's ratio of 0.3 or less.

According to some embodiments, the auxetic patterns of the plurality of pattern layers may have the same shape as each other.

According to some embodiments, the auxetic patterns of at least two of the plurality of pattern layers may have shapes different from each other.

According to some embodiments, the protective member may further include at least one resin layer alternately arranged with the plurality of pattern layers.

According to some embodiments, the modulus of each of the plurality of pattern layers may be greater than the modulus of the at least one resin layer.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
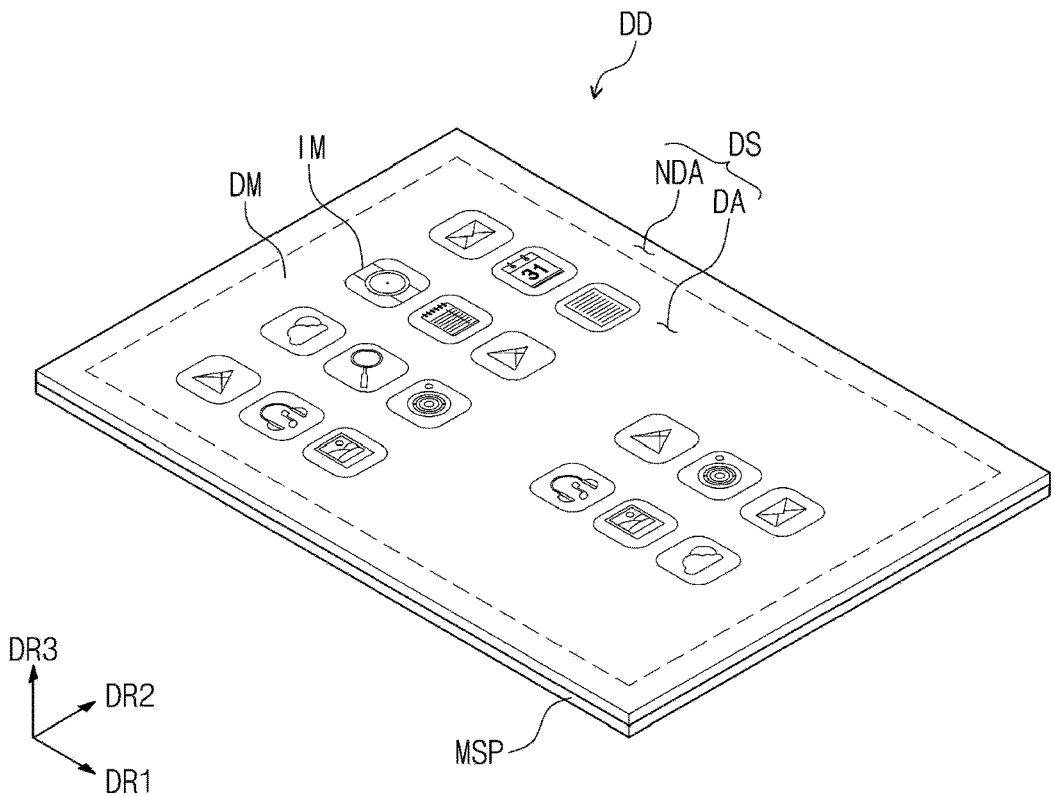
FIG. 1 is a perspective view of a display apparatus according to some embodiments of the inventive concept.

Because the inventive concept may be variously changed and have various forms, specific embodiments are illustrated in the drawings and described in detail in the text. However, this is not intended to limit the inventive concept to the specific forms disclosed, and it should be understood that all modifications, equivalents and substitutes which do not depart from the spirit and technical scope of the inventive concept are included in the inventive concept.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of elements are exaggerated for effective description of the technical contents. As used herein, the term "and/or" includes any and all combinations that the associated configurations can define.

It will be understood that, although the terms first, second, etc. may be used herein to describe various elements, these elements should not be limited by these terms. These terms are only used to distinguish one element from another element. For example, a first element could be termed a second element without departing from the scope of the present invention. Similarly, the second element may also be referred to as the first element. The terms of a singular form include plural forms unless otherwise specified.

In addition, terms, such as "under", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display apparatus according to some embodiments of the inventive concept will be described in more detail with reference to the accompanying drawings.

FIG. 1 is a perspective view of a display apparatus according to some embodiments of the inventive concept.

The display apparatus DD may be activated according to an electrical signal and display images. For example, the display apparatus DD may be a large-sized device such as a television or an external billboard, or a small- or medium-sized device such as a monitor, a mobile phone, a tablet computer, a navigation system, or a game machine. However, the embodiments of the display apparatus DD are not limited to the above examples as long as they do not depart from the spirit and concepts of the present invention.

Figure 2:
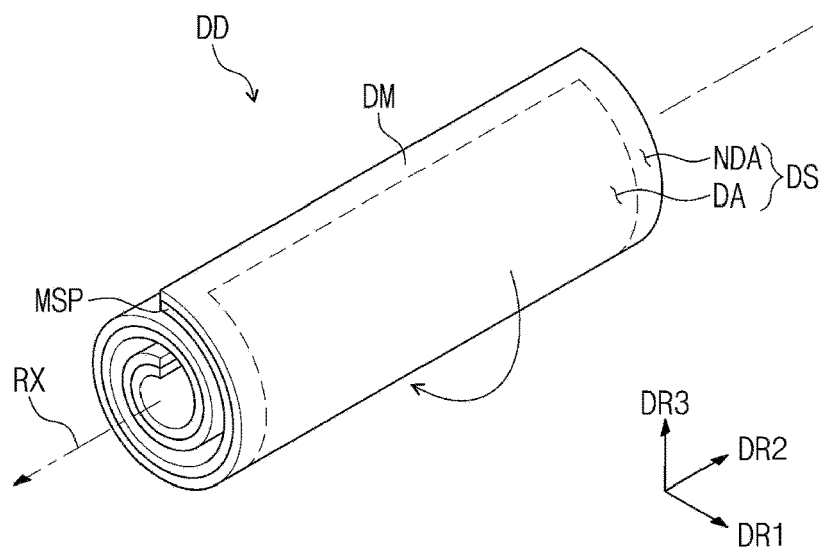
FIG. 2 is a perspective view of a rolled display apparatus according to some embodiments of the inventive concept.

The display apparatus DD according to some embodiments of the inventive concept may be a flexible device. The term "flexible" means a property of being bent and may include everything from a structure that is completely folded to a structure that is bent to the level of several nanometers. For example, the flexible display apparatus DD may include a rollable display apparatus that is rolled around a virtual axis. FIG. 1 illustrates the display apparatus DD in an unfolded state, and FIG. 2 illustrates the display apparatus DD in a rolled state.

Referring to FIG. 1, on a plane (or in a plan view, or a view perpendicular or normal with respect to a display surface), the display apparatus DD in an unfolded state may have a rectangular shape having long sides extending in a first direction DR1 and short sides extending in a second direction DR2 crossing the first direction DR1. However, the embodiments of the inventive concept are not limited thereto, and the display apparatus DD may have various shapes, such as a circular shape or a polygonal shape.

The display apparatus DD may include a display module DM and a support member MSP. The display module DM may generate an image IM in response to an electrical signal and display the image IM to a user through a display surface DS. The display module DM in an unfolded state may display the image IM in a third direction DR3 on the display surface DS parallel to each of the first direction DR1 and the second direction DR2. The display surface DS on which the image IM is displayed may correspond to the front surface of the display apparatus DD.

The image IM which is provided from the display module DM may include a still image as well as a dynamic image. FIG. 1 illustrates a plurality of icons as examples of the image IM.

Meanwhile, the front surface (or upper surface) and the rear surface (or lower surface) of each member constituting the display apparatus DD may be opposite to each other in the third direction DR3, and the normal direction of each of the front and rear surfaces may be substantially parallel to the third direction DR3. The separation distance between the front surface and the rear surface defined along the third direction DR3 may correspond to the thickness of a member (or unit).

In this specification, the expression "on a plane" may be defined as a state viewed from the third direction DR3. In this specification, the expression "on a cross section" may be defined as a state viewed from the first direction DR1 or the second direction DR2. However, the directions indicated by the first to third directions DR1, DR2, and DR3 are relative concepts and may be converted into other directions.

The display surface DS of the display module DM may include a display region DA and a peripheral region NDA. The display region DA may be a region in which the image IM is displayed, and the peripheral region NDA may be a region in which the image IM is not displayed. The peripheral region NDA may be provided as a region having a lower light transmittance than the display region DA and having a color (e.g., a set or predetermined color).

The peripheral region NDA may be adjacent to the display region DA. For example, the peripheral region NDA may surround the display region DA (e.g., outside a footprint of the display region DA) and define the border of the display module DM. However, the embodiments of the inventive concept are not limited thereto, and the peripheral region NDA may be located adjacent to only one side of the display region DA or may be located on a side surface of the display apparatus DD instead of the front surface thereof. According to some embodiments of the inventive concept, the peripheral region NDA may be omitted.

The support member MSP may be located on the rear surface of the display module DM to support the display module DM. The rear surface of the display module DM may be a surface opposite to the display surface DS. The display module DM may be coupled to the support member MSP by an adhesive member located on the rear surface thereof. However, as long as a support member MSP can support the display module DM, the support member MSP is not limited to any one embodiment.

The support member MSP may be bent at a curvature (e.g., a set or predetermined curvature), support the rolled display module DM, and prevent or reduce deformation of the display module DM. The support member MSP may prevent or reduce deterioration of the surface quality of the display module DM despite the repeated rolling operation of the display apparatus DD.

The support member MSP may supplement the rigidity of the display module DM by having a rigidity (e.g., a set or predetermined rigidity). Accordingly, the support member MSP may prevent or reduce instances of the display module DM being damaged by an external impact.

Referring to FIG. 2, the display apparatus DD may be rolled around a virtual rolling axis RX (hereinafter referred to as a rolling axis RX) extending in one direction. For example, the display apparatus DD may be rolled around the rolling axis RX extending along the second direction DR2. FIG. 2 illustrates an example of the rolling axis RX extending along the second direction DR2 parallel to the short sides of the display apparatus DD, but the embodiments of the inventive concept are not limited thereto, and the display apparatus DD may be rolled around a rolling axis parallel to the long sides of the display apparatus DD.

The display module DM may be rolled so that the display surface DS faces the outside. The support member MSP may be located under the display module DM to support the display module DM and may be rolled together with the display module DM. However, the embodiments of the inventive concept are not limited thereto, and the support member MSP may be rolled to face the outside. As the display apparatus DD is rollable, the display apparatus DD may be easily carried. In addition, the display apparatus DD having a large-area display surface DS may be rolled and accommodated in an accommodating member whenever necessary.

Figure 3:
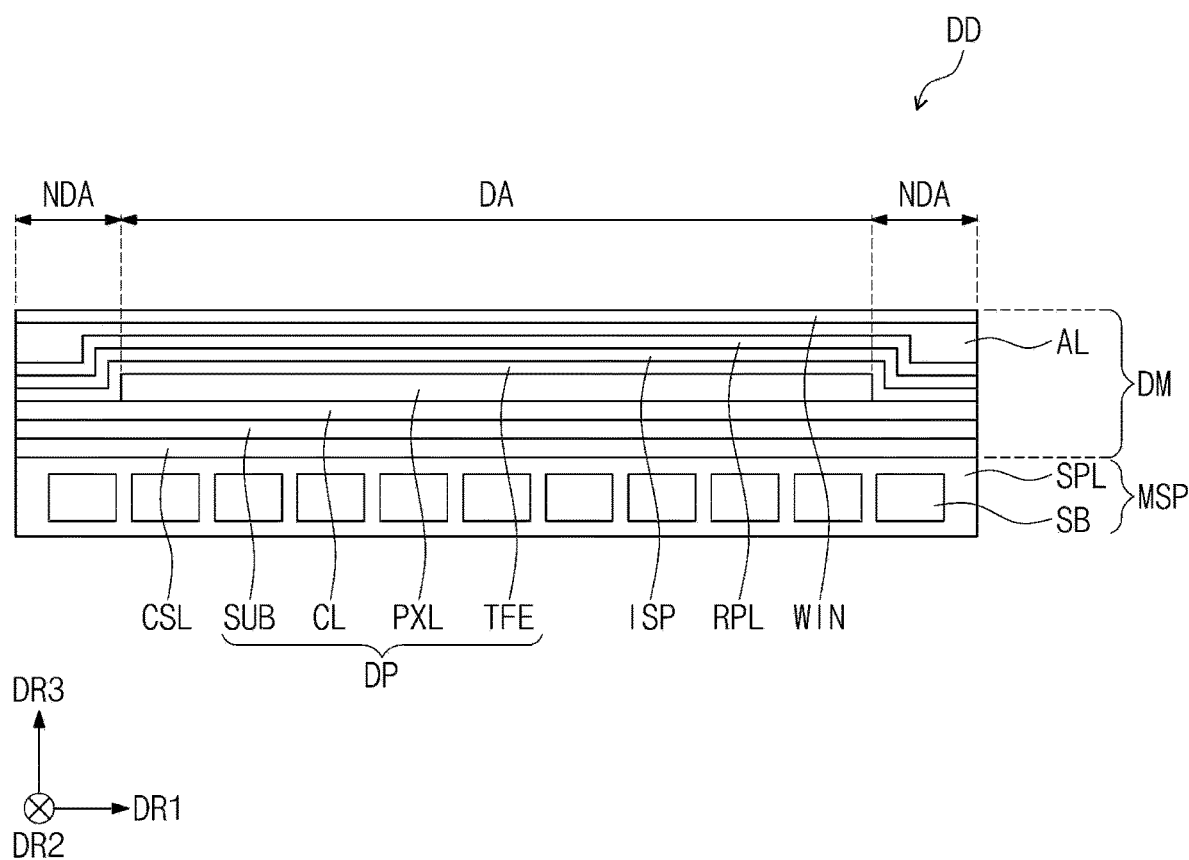
FIG. 3 is a cross-sectional view of a display apparatus according to some embodiments of the inventive concept.

FIG. 3 is a cross-sectional view of a display apparatus according to some embodiments of the inventive concept. The display apparatus DD may include a display module DM and a support member MSP, and the aforementioned description may be equally applied to the description of each component.

Referring to FIG. 3, the display module DM may include a display panel DP, an input sensing layer ISP, a reflection prevention layer RPL, a window WIN, an adhesive layer AL, and a protective member CSL.

The display panel DP may be a flexible display panel. The display panel DP according to some embodiments of the inventive concept may be a light-emitting display panel, and the embodiments of the inventive concept are not particularly limited. For example, the display panel DP may be an organic light-emitting display panel or an inorganic light-emitting display panel. A light-emitting layer of the organic light-emitting display panel may contain an organic light-emitting material. A light-emitting layer of the inorganic light-emitting display panel may contain an inorganic light-emitting material such as a quantum dot or a quantum rod.

The display panel DP may include a base substrate SUB, a circuit layer CL, a display element layer PXL, and an encapsulation layer TFE. The circuit layer CL, the display element layer PXL, and the encapsulation layer TFE may be sequentially stacked on the base substrate SUB along the third direction DR3.

The base substrate SUB may include a display region DA and a peripheral region NDA, and the display region DA and the peripheral region NDA of the base substrate SUB may correspond to the display region DA and the peripheral region NDA of the display apparatus DD described above. The base substrate SUB may provide a base surface on which the circuit layer CL is located.

The base substrate SUB may include a flexible plastic substrate. For example, the base substrate SUB may include at least one synthetic resin layer. The synthetic resin layer may contain at least any one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, a perylene-based resin, or a polyimide-based resin. However, the material of the base substrate SUB is not limited to the above examples.

The circuit layer CL may be located on the base substrate SUB. The circuit layer CL may include at least one insulating layer, driving elements, signal lines, and signal pads. The circuit layer CL may include a conductive pattern and a semiconductor pattern which form the driving elements, the signal lines, and the signal pads. After an insulating layer, a semiconductor layer, and a conductive layer are formed on the base substrate SUB by coating, deposition, or the like, the insulating layer, the semiconductor layer, and the conductive layer may be selectively patterned through a photolithography process to form the driving elements, the signal lines and the signal pads which are included in the circuit layer CL.

The display element layer PXL may be located on the circuit layer CL. The display element layer PXL may include light-emitting elements arranged to overlap the display region DA. The light-emitting elements of the display element layer PXL may be electrically connected to the driving elements of the circuit layer CL to provide light in the display region DA according to a signal of the driving elements.

The encapsulation layer TFE may be located on the display element layer PXL to seal the light-emitting elements. The encapsulation layer TFE may include a plurality of thin films. The thin films of the encapsulation layer TFE may be formed to improve the optical efficiency of the light-emitting element or to protect the light-emitting element. According to some embodiments of the inventive concept, the encapsulation layer TFE may include at least one inorganic film or one organic film. The inorganic film of the encapsulation layer TFE may protect the light-emitting element from moisture/oxygen. The organic film of the encapsulation layer TFE may protect the light-emitting element from foreign substances such as dust particles.

The input sensing layer ISP may be located on the display panel DP. The input sensing layer ISP may be directly located on the display panel DP without a separate adhesive member. That is, after the display panel DP is formed, the input sensing layer ISP may be formed on a base surface provided by the display panel DP through a continuous process. For example, the input sensing layer ISP may be directly located on the encapsulation layer TFE. However, the embodiments of the inventive concept are not limited thereto, and the input sensing layer ISP may be manufactured in a panel form through a separate process different from that of the display panel DP and then may be attached on the display panel DP by an adhesive member.

The input sensing layer ISP may detect an external input applied from the outside of the display apparatus DD and obtain the coordinate information of the external input. The input sensing layer ISP may be driven in various methods, such as a capacitive method, a resistive film method, an infrared method, or a pressure method, and the embodiments of the inventive concept are not limited to any one method.

The reflection prevention layer RPL may be located on the input sensing layer ISP. The reflection prevention layer RPL may be directly located on the input sensing layer ISP. However, the embodiments of the inventive concept are not limited thereto, and the reflection prevention layer RPL may be attached on the input sensing layer ISP by a separate adhesive member.

The reflection prevention layer RPL may reduce the reflectance of external light incident from the upper side of the display apparatus DD. The reflection prevention layer RPL may include various embodiments that reduce the reflectance of external light.

According to some embodiments of the inventive concept, the reflection prevention layer RPL may include a retarder and/or a polarizer. The retarder may include a λ/2 retarder and/or a λ/4 retarder. The polarizer may include a film type or a liquid crystal coating type. The film-type polarizer may include a stretched synthetic resin film, and the liquid crystal coating-type polarizer may include liquid crystals arranged in an arrangement or pattern (e.g., a set or predetermined arrangement or pattern). The embodiments of the inventive concept are not limited thereto, and the retarder and the polarizer may be implemented as one polarizing film.

According to some embodiments of the inventive concept, the reflection prevention layer RPL may include color filters. The color filters may be arranged to correspond to the arrangements and light-emitting colors of pixels included in the display panel DP. The color filters may receive and filter external light so as to display the same colors as those emitted by the pixels. The reflection prevention layer RPL may further include a black matrix located adjacent to the color filters.

According to some embodiments of the inventive concept, the reflection prevention layer RPL may include a destructive interference structure. For example, the destructive interference structure may include a first reflective layer and a second reflective layer which are arranged in different layers. First reflected light reflected from the first reflective layer and second reflected light reflected from the second reflective layer may destructively interfere with each other and, accordingly, the reflection prevention layer RPL may reduce the reflectance of external light.

The adhesive layer AL may be located on the reflection prevention layer RPL. The adhesive layer AL may be located between the reflection prevention layer RPL and the window WIN to couple the reflection prevention layer RPL and the window WIN to each other. The adhesive layer AL may contain a transparent adhesive such as an optically clear adhesive film (OCA), an optically clear adhesive resin (OCR), or a pressure sensitive adhesive film (PSA). However, the type of adhesive contained in the adhesive layer AL is not limited thereto.

The window WIN may be located on the reflection prevention layer RPL. The window WIN may cover the entire upper surface of the display module DM and protect the components of the display module DM from external impacts and scratches.

The window WIN may contain an optically transparent insulating material. For example, the window WIN may include glass, sapphire, or a polymer. The window WIN may have a single-layered or multi-layered structure. The window WIN may further include a functional layer such as an anti-fingerprint layer, a phase control layer, and a hard coating layer located on an optically transparent substrate.

The protective member CSL may be located on the rear surface of the display panel DP. For example, the protective member CSL may be coupled to the rear surface of the base substrate SUB of the display panel DP. The protective member CSL may be attached on the rear surface of the base substrate SUB by an adhesive member, but the embodiments of the inventive concept are not limited thereto and the protective member CSL may be formed directly on the rear surface of the base substrate SUB.

When pattern layers included in the protective member CSL receive a tensile force in a specific direction, substantially little deformation may occur in a direction crossing the direction in which the tensile force is applied. The protective member CSL may improve the impact resistance of the display module DM without deteriorating the flexibility of the display module DM. The protective member CSL may protect the display panel DP from an external impact. In addition, the protective member CSL may reduce a possibility that the surface of the display panel DP is dented, wrinkled or distorted when the display module DM is rolled, thereby improving the surface quality of the display apparatus DD. A detailed description of the configuration of the protective member CSL will be given later.

The support member MSP may include a support layer SPL and a plurality of support bars SB. The support bars SB may be arranged along a direction crossing an extension direction. For example, as illustrated in FIG. 3, the support bars SB may extend in the second direction DR2 and be arranged along the first direction DR1 in the support layer SPL. The support bars SB may be equally spaced apart from each other in the first direction DR1. However, the distance between the support bars SB is not limited thereto.

Each of the support bars SB may have a rectangular shape on a cross section viewed in a direction parallel to the extension direction of the support bars SB. However, the shape of the support bars SB on the cross section is not limited thereto, and the support bars SB may have a circular shape, an oval shape, or a polygonal shape such as a rhombus, an inverted trapezoid, and an inverted triangle.

The support layer SPL may cover the support bars SB. According to some embodiments of the inventive concept, the support bars SB may be inserted into the support layer SPL. That is, the integrally formed support layer SPL may cover the upper surface, lower surface, and side surfaces of each of the support bars SB. The support layer SPL may fill spaces between the support bars SB spaced apart in the first direction DR1 and connect the support bars SB to each other. However, the support layer SPL may not completely cover the entire surface of the support bars SB and may be provided in a form of filling the separation spaces between the support bars SB.

Meanwhile, according to some embodiments of the inventive concept, the support layer SPL may be omitted. In this case, the support bars SB may be located on the rear surface of the display module DM to support the display module DM.

The modulus of the support bars SB may be greater than the modulus of the support layer SPL. For example, the modulus of the support bars SB may be about 1 gigapascal (GPa) to about 500 gigapascals (GPa) and, specifically, the modulus of the support bars SB may be about 50 gigapascals (GPa) to about 200 gigapascals (GPa). The modulus of the support layer SPL may be about 10 kilopascals (KPa) to 20 megapascals (MPa) and, specifically, the modulus of the support layer SPL may be about 10 kilopascals (KPa) to about 100 kilopascals (KPa). However, the modulus values of the support bars SB and the support layer SPL are not limited to the above examples. The support bars SB having a relatively large modulus may improve the impact resistance of the support member MSP and stably support the display module DM.

The support bars SB may contain a material having greater rigidity than the support layer SPL. For example, the support bars SB may contain metal or carbon fiber. The support bars SB may contain aluminum, stainless steel, or invar. However, the material of the support bars SB is not limited to the above examples.

The support layer SPL may contain a material having greater flexibility than the support bars SB. The support layer SPL may contain an elastomer having an elastic force (e.g., a set or predetermined elastic force). For example, the support layer SPL may contain at least one of thermoplastic polyurethane, silicone, thermoplastic rubber, elastolefin, thermoplastic olefin, polyamide, polyether block amide, synthetic polyisoprene, polybutadiene, chloroprene rubber, butyl rubber, styrene-butadiene, epichlorohydrin rubber, polyacrylic rubber, silicone rubber, fluorosilicone rubber, fluoroelastomer, or ethylene-vinyl acetate. However, the material of the support layer SPL is not limited to the above examples.

The support layer SPL may connect the support bars SB to each other and allow the support member MSP to be easily bent at a curvature (e.g., a set or predetermined curvature). The support layer SPL may cover the support bars SB and provide a flat upper surface to the display module DM. Accordingly, the support layer SPL may improve the surface quality of the display module DM.

Figure 4:
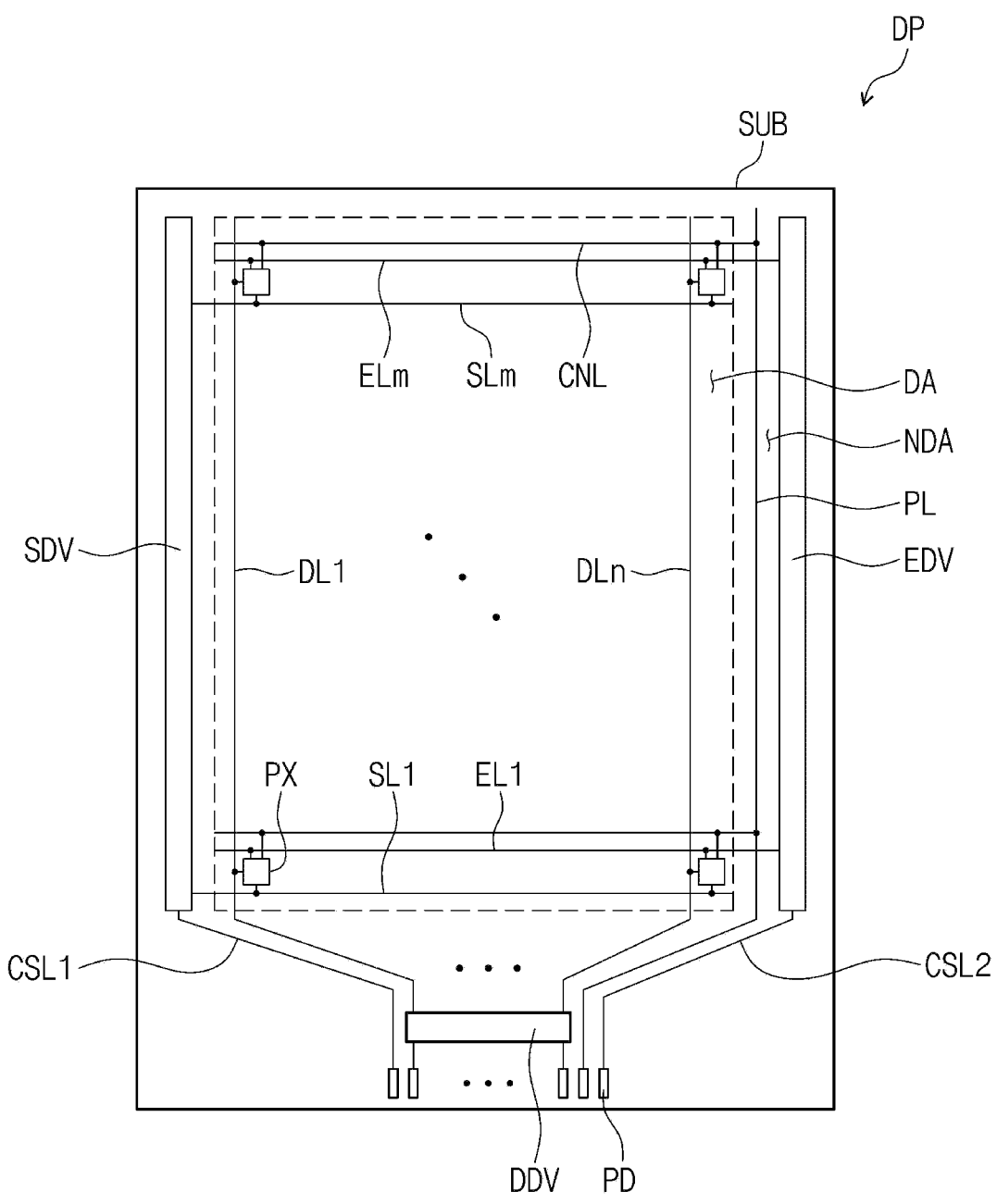
FIG. 4 is a plan view of a display panel according to some embodiments of the inventive concept.

FIG. 4 is a plan view of a display panel according to some embodiments of the inventive concept. FIG. 4 schematically illustrates one configuration of the display panel DP on a plane.

Referring to FIG. 4, the display panel DP may include a base substrate SUB, a plurality of pixels PX, a plurality of signal lines SL1 to SLm, DL1 to DLn, EL1 to ELm, CSL1, CSL2, PL, and CNL electrically connected to the pixels PX, a scan driver SDV, a data driver DDV, and a light-emitting driver EDV.

As described above, the base substrate SUB may include a display region DA and a peripheral region NDA. The base substrate SUB may provide a base surface on which electrical elements and wirings of the display panel DP are located. FIG. 4 illustrates the base substrate SUB having a rectangular shape parallel to each of the first and second directions DR1 and DR2 on a plane, but the embodiments of the inventive concept are not limited thereto, and the shape of the base substrate SUB may be variously designed according to the structure of the display apparatus DD (refer to FIG. 1).

Each of the pixels PX may include a light-emitting element, and a pixel driving circuit including a plurality of transistors (e.g., a switching transistor, a driving transistor, and the like) connected to the light-emitting element and at least one capacitor. Each of the pixels PX may emit light in response to an electrical signal which is applied to a pixel PX.

The pixels PX may be located in the display region DA. However, this is illustrated as an example, and some of the pixels PX may include a thin film transistor located in the peripheral region NDA, and the embodiments of the inventive concept are not limited thereto.

Each of the scan driver SDV, the data driver DDV, and the light-emitting driver EDV may be located in the peripheral region NDA. However, the embodiments of the inventive concept are not limited thereto, and at least one of the scan driver SDV, the data driver DDV, or the light-emitting driver EDV may overlap the display region DA. In this way, the area of the peripheral region NDA may be reduced, and accordingly, a bezel area of the display apparatus DD (refer to FIG. 1) may be reduced.

The data driver DDV may be provided in the form of an integrated circuit chip defined as a driving chip so as to be mounted on the peripheral region NDA of the display panel DP. However, the embodiments of the inventive concept are not limited thereto, and the data driver DDV may be mounted on a separate flexible circuit board connected to the display panel DP so as to be electrically connected to the display panel DP.

The plurality of signal lines SL1 to SLm, DL1 to DLn, EL1 to ELm, CSL1, CSL2, PL, and CNL may include scan lines SL1 to SLm, data lines DL1 to DLn, and light-emitting lines EL1 to ELm, first and second control lines CSL1 and CSL2, a power line PL, and connection lines CNL, wherein m and n are natural numbers.

The scan lines SL1 to SLm may extend in the second direction DR2 to be connected to the scan driver SDV. The data lines DL1 to DLn may extend in the first direction DR1 to be connected to the data driver DDV. The light-emitting lines EL1 to ELm may extend in the second direction DR2 to be connected to the light-emitting driver EDV.

The power line PL may extend in the first direction DR1 to be located in the peripheral region NDA. The power line PL may be located between the display region DA and the light-emitting driver EDV. However, the arrangement position of the power line PL is not limited thereto.

The connection lines CNL may extend in the second direction DR2 and be arranged in the first direction DR1 to be connected to the power line PL and the pixels PX. Each of the connection lines CNL may be located on a layer different from that of the power line PL and may be electrically connected to the power line PL through a contact hole. However, the embodiments of the inventive concept are not limited thereto, and the connection lines CNL may be integrally formed in the same layer as the power line PL. A power voltage may be applied to the pixels PX through the power line PL and the connection lines CNL connected to each other.

The first control line CSL1 may be connected to the scan driver SDV. The second control line CSL2 may be connected to the light-emitting driver EDV.

Pads PD may be located adjacent to the lower end of the peripheral region NDA. The pads PD may be located closer to the lower end of the display panel DP than the data driver DDV. The pads PD may be arranged to be spaced apart from each other along the second direction DR2. The display apparatus DD (refer to FIG. 1) may include a circuit board including a timing controller configured to control the operations of the scan driver SDV, the data driver DDV, and the light-emitting driver EDV, and a voltage generator configured to generate a voltage, and the pads PD may be portions to which the circuit board of the display apparatus DD (refer to FIG. 1) is connected.

Each of the pads PD may be connected to a corresponding signal line among the plurality of signal lines. The power line PL and the first and second control lines CSL1 and CSL2 may be connected to the pads PD. The data lines DL1 to DLn may be electrically connected to corresponding pads PD through the data driver DDV.

The scan driver SDV may generate scan signals in response to a scan control signal. The scan signals may be applied to the pixels PX through the scan lines SL1 to SLm. The data driver DDV may generate data voltages corresponding to image signals in response to a data control signal. The data voltages may be applied to the pixels PX through the data lines DL1 to DLn. The light-emitting driver EDV may generate light-emitting signals in response to a light-emitting control signal. The light-emitting signals may be applied to the pixels PX through the light-emitting lines EL1 to ELm.

The pixels PX may receive the data voltages in response to the scan signals. The pixels PX may display an image by emitting light having a luminance which corresponds to the data voltages in response to the light-emitting signals. The light-emitting time of the pixels PX may be controlled by the light-emitting signals. Accordingly, the display panel DP may output the image by the pixels PX through the display region DA.

Figure 5:
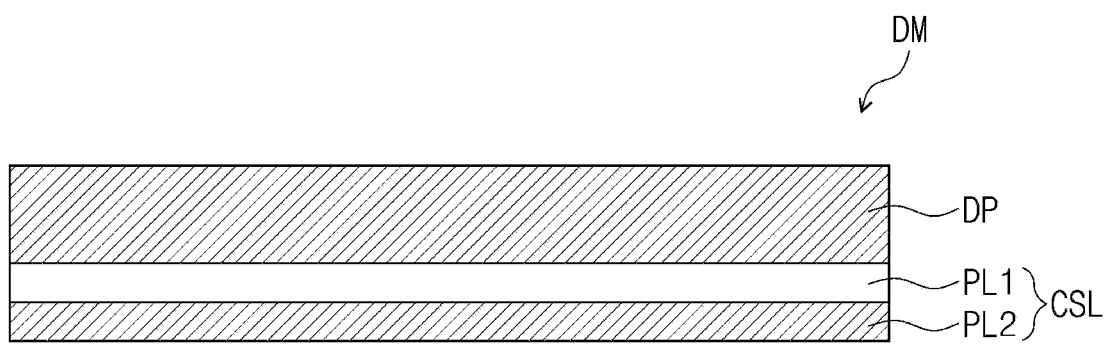
FIG. 5 is a cross-sectional view of a display module according to some embodiments of the inventive concept.
Figure 5:
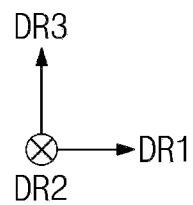

FIG. 5 is a cross-sectional view of a display module according to some embodiments of the inventive concept. FIG. 5 schematically illustrates a cross section of a display panel DP and a protective member CSL, and the aforementioned description may be applied to the description of each component.

Referring to FIG. 5, the protective member CSL may include a plurality of pattern layers PL1 and PL2 sequentially arranged on the rear surface of the display panel DP. By including the pattern layers PL1 and PL2 sequentially stacked along the thickness direction of the display module DM, the protective member CSL may have improved impact resistance compared to including a single pattern layer. FIG. 5 illustrates embodiments having two pattern layers PL1 and PL2, but the number of pattern layers included in the protective member CSL is not limited thereto, and the number of pattern layers may vary according to various embodiments.

The pattern layers PL1 and PL2 may include a first pattern layer PL1 and a second pattern layer PL2. The first pattern layer PL1 may be located on the rear surface of the display panel DP, and the second pattern layer PL2 may be arranged to face the rear surface of the display panel DP with the first pattern layer PL1 interposed therebetween.

Each of the first pattern layer PL1 and the second pattern layer PL2 may include a plurality of patterns. Each of the patterns may include an opening. That is, each of the first pattern layer PL1 and the second pattern layer PL2 may include a plurality of openings. As the first pattern layer PL1 and the second pattern layer PL2 include the openings, the flexibility of the protective member CSL may be improved and the protective member CSL may be easily rolled when the display module DM is rolled.

The patterns of the first pattern layer PL1 and the patterns of the second pattern layer PL2 may be arranged to be displaced from each other. That is, at least some of the openings of the first pattern layer PL1 may overlap the patterns of the second pattern layer PL2. Accordingly, the aperture ratio of the first pattern layer PL1 on a plane may be substantially reduced and, likewise, the aperture ratio of the second pattern layer PL2 may also be reduced. Accordingly, the protective member CSL may have flexibility due to the openings and have improved impact resistance as well.

Each of the first pattern layer PL1 and the second pattern layer PL2 may have a modulus (e.g., a set or predetermined modulus). For example, each of the first pattern layer PL1 and the second pattern layer PL2 may contain a stainless steel (SUS) or steel material. The embodiments of the inventive concept are not limited thereto, and the first pattern layer PL1 and the second pattern layer PL2 may contain a polymer having a relatively high modulus value.

Each of the first pattern layer PL1 and the second pattern layer PL2 may have an auxetic structure including patterns. In this specification, the patterns forming the auxetic structure may be referred to as auxetic patterns.

Each of the first pattern layer PL1 and the second pattern layer PL2 may have an auxetic structure which has a Poisson's ratio substantially close to 0. For example, the Poisson's ratio may be about 0.3 or less, specifically, about 0.1 or less. Here, the Poisson's ratio represents the deformation rate of a pattern layer in a direction perpendicular to a direction in which a tensile force is applied, when compared to the deformation rate of the pattern layer in the direction in which the tensile force is applied, when the tensile force is applied to the pattern layer. The closer to 0 the Poisson's ratio of the pattern layer is, the smaller the degree of deformation of the shape may be when the tensile force is applied to the pattern layer. Accordingly, the first pattern layer PL1 and the second pattern layer PL2 may have a flexibility (e.g., a set or predetermined flexibility) due to the openings and also prevent or reduce deterioration of the surface quality of the display apparatus.

According to some embodiments of the inventive concept, each of the first pattern layer PL1 and the second pattern layer PL2 may have an auxetic structure which has a negative Poisson's ratio. For example, the auxetic structure may include a re-entrant structure, a chiral structure, and the like. If the Poisson's ratio is negative, when a tensile force is applied to a pattern layer, the pattern layer may be elongated both in a direction in which the tensile force is applied and in a direction perpendicular thereto. However, when the Poisson's ratio of each of the first pattern layer PL1 and the second pattern layer PL2 has a value close to 0, the embodiments of the pattern layer are not necessarily limited thereto. Hereinafter, the shape of the pattern layer according to some embodiments of the inventive concept will be described in more detail with reference to drawings.

FIGS. 6A to 6F and FIGS. 7A to 7C are plan views of pattern layers according to embodiments of the inventive concept. FIGS. 6A to 6F and FIGS. 7A to 7C illustrate the shapes of the first pattern layer PL1 among the plurality of pattern layers PL1 and PL2 (refer to FIG. 5) described above. The description thereof may be equally applied to the second pattern layer PL2 (refer to FIG. 5). Meanwhile, the shapes of the first pattern layer PL1 illustrated in FIGS. 6A to 6F and FIGS. 7A to 7C are only examples, and the shapes of the pattern layer are not necessarily limited thereto as long as the Poisson's ratios thereof are close to 0.

Referring to FIGS. 6A to 6F, the first pattern layer PL1 may include a plurality of patterns PT. Each of the patterns PT may have a closed line shape on a plane and include an opening OP1 surrounded by the closed line. That is, the first pattern layer PL1 may include a plurality of openings OP1 surrounded by closed lines connected to each other. Hereinafter, the openings OP1 included in the first pattern layer PL1 may be referred to as first openings OP1.

The patterns PT may be connected to each other in the same layer. The patterns PT may be engaged with and connected to adjacent patterns PT. As the patterns PT are engaged with and connected to each other, when a tensile force is applied to the first pattern layer PL1, the tensile force may be dispersed along the patterns PT and the impact resistance of the first pattern layer PL1 may be relatively improved.

In the embodiments illustrated with respect to FIGS. 6A to 6E, a portion in which the patterns PT are engaged with and connected to each other may include a curve. As the patterns PT are engaged with and connected to each other in a curved shape, the tensile force may be better dispersed. However, the embodiments of the inventive concept are not limited thereto, and as illustrated in FIG. 6F, a portion in which the patterns PT are engaged with and connected to each other may include a straight line.

Hereinafter, the shapes of the patterns PT will be described based on one pattern located in the central region among the patterns PT illustrated in FIGS. 6A to 6F and the patterns located adjacent and connected thereto.

Figure 6A:
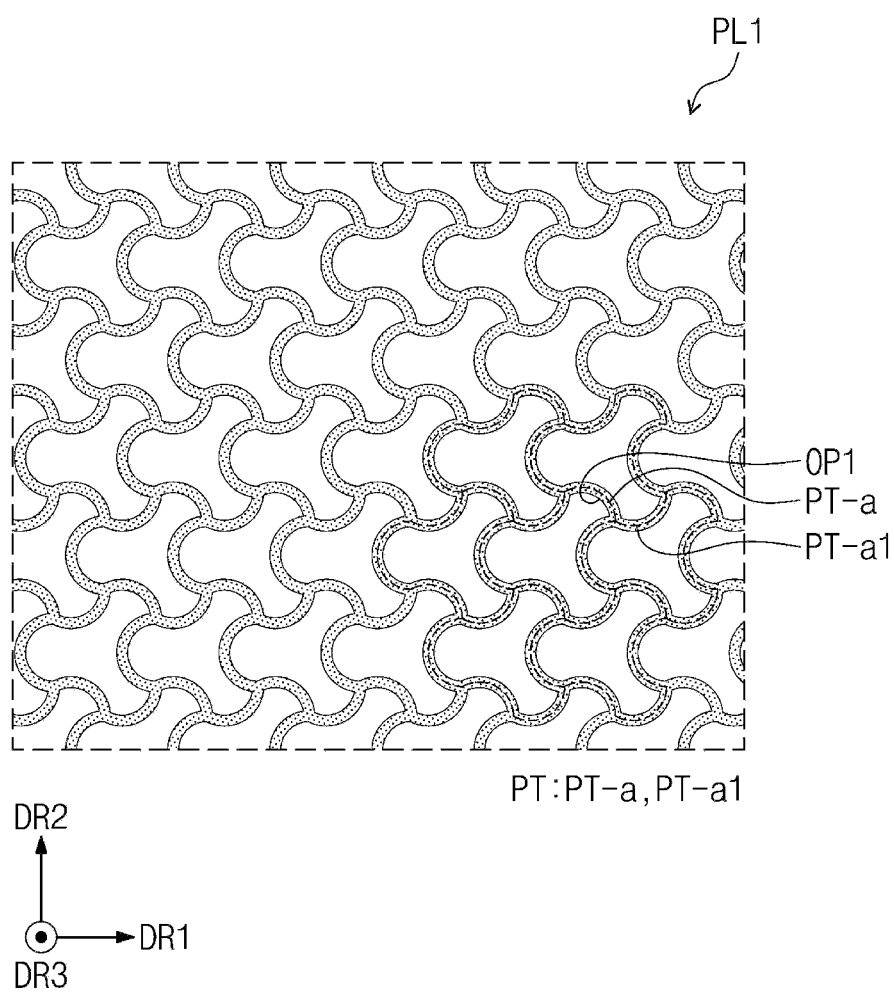
FIGS. 6A to 6F are plan views of a pattern layer according to some embodiments of the inventive concept.

Referring to FIG. 6A, a pattern PT-a may include circular arcs connected to each other with an inflection point interposed therebetween. The pattern PT-a may be connected to patterns PT-a1 located adjacent thereto in a manner in which the circular arc-shaped portions of the patterns PT-a1 are engaged with each other. According to some embodiments of the inventive concept, the pattern PT-a may be engaged with and connected to six adjacent patterns PT-a1. The circular arc portion of the pattern PT-a which is convex along one direction may be engaged with and connected to the circular arc portion of an adjacent pattern PT-a1 which is concave along the one direction. The patterns PT may have the same shape as each other.

Figure 6B:
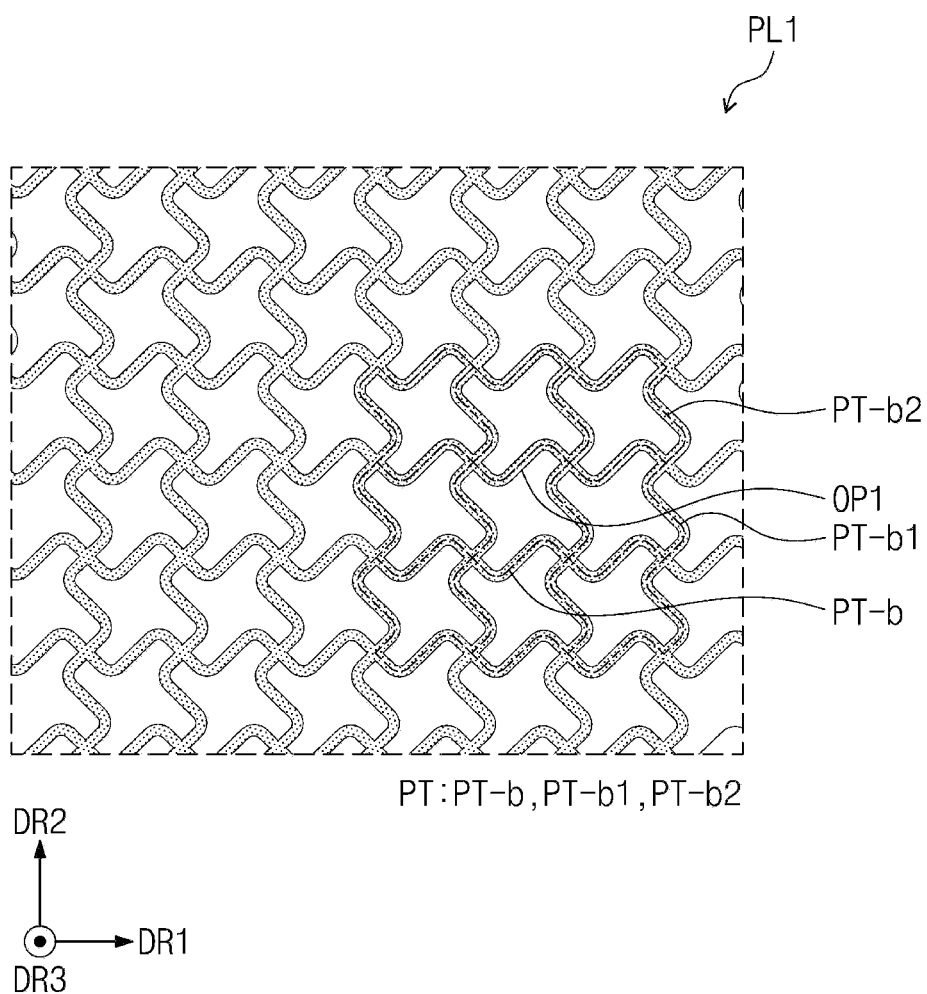

Referring to FIG. 6B, a pattern PT-b may include curves, which have inflection points, form vertices, and are connected to each other. The pattern PT-b may have a shape similar to a pinwheel having four vertices on a plane. According to some embodiments of the inventive concept, the pattern PT-b may be connected to four adjacent patterns PT-b1 in a manner in which the curves thereof having an inflection point are engaged with each other, and the vertex of the pattern PT-b and the vertices of other patterns PT-b2 located adjacent thereto may be connected to each other. The patterns PT may have the same shape as each other.

Figure 6C:
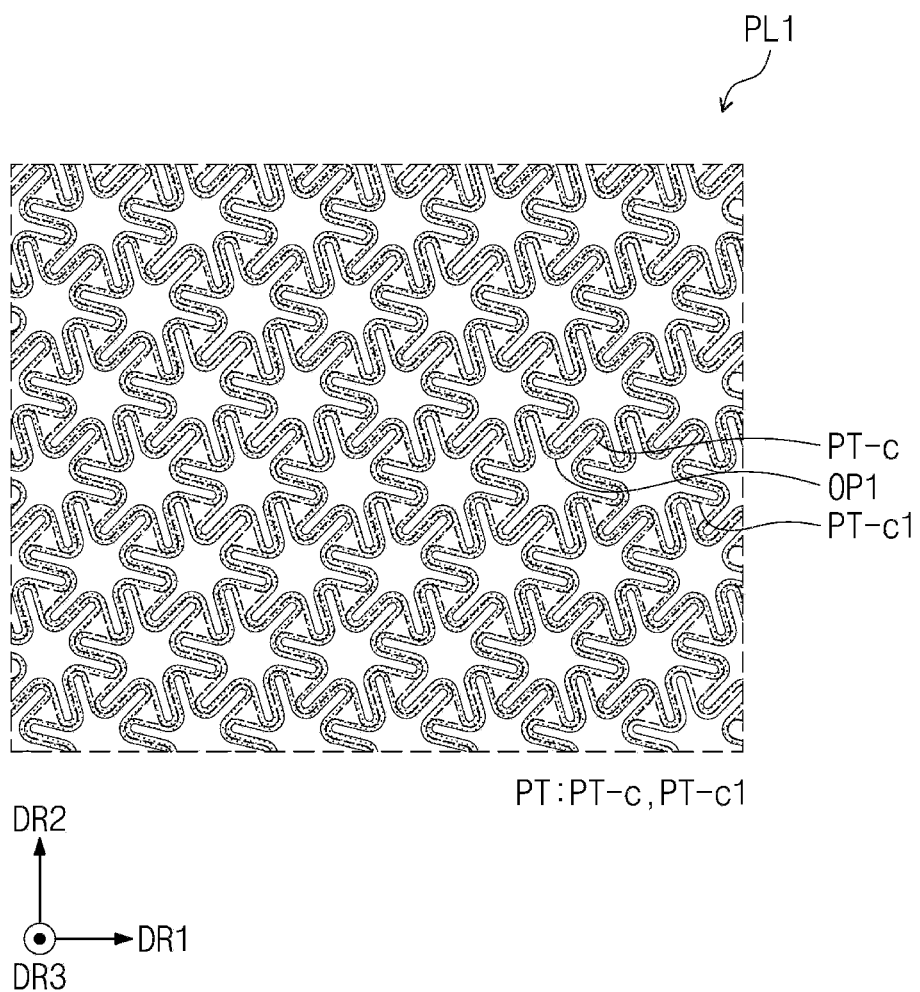

Referring to FIG. 6C, a pattern PT-c may include curves which are convex toward different directions, respectively. The pattern PT-c may include curves protruding in a direction away from the center of a first opening OP1. The pattern PT-c may have a shape similar to a snowflake on a plane. According to some embodiments of the inventive concept, the pattern PT-c may be engaged with and connected to six adjacent patterns PT-c1. The patterns PT may have the same shape as each other.

Figure 6D:
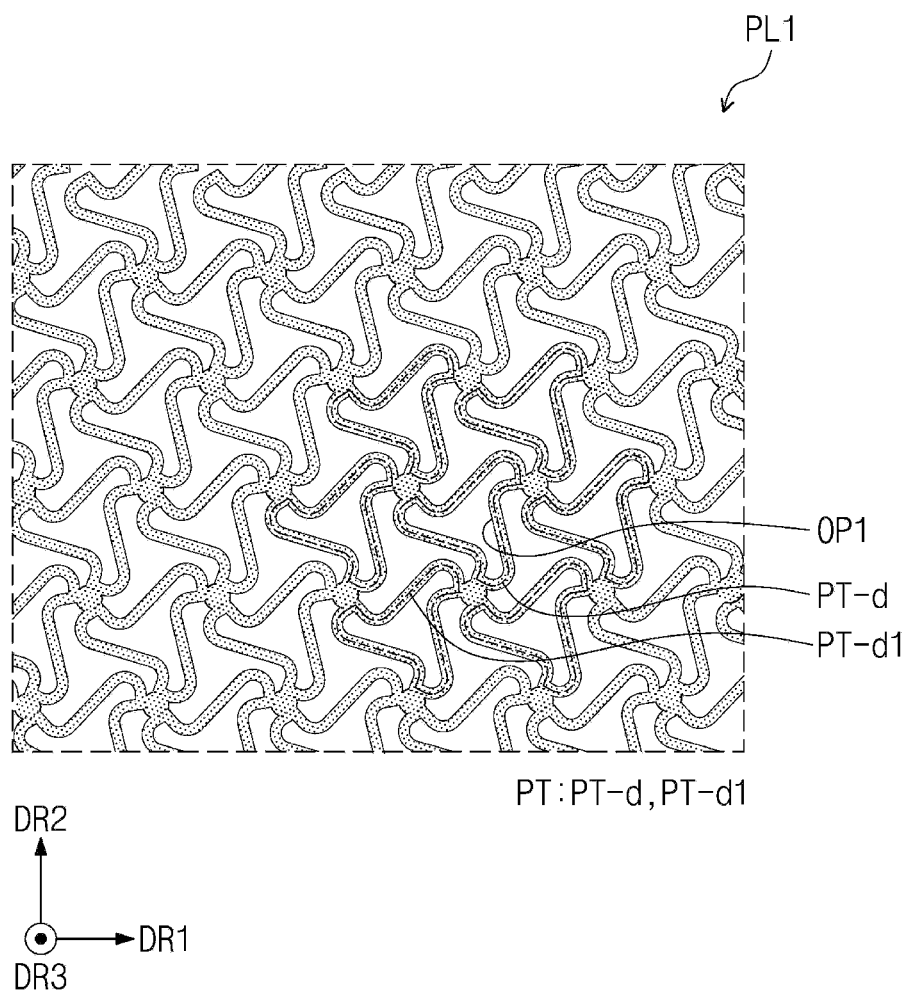

Referring to FIG. 6D, a pattern PT-d may include curves having an inflection point and connected to each other. The pattern PT-d may have a shape similar to a boomerang on a plane. According to some embodiments of the inventive concept, the pattern PT-d may be connected to three adjacent patterns PT-d1 in a manner in which the curves thereof having an inflection point are engaged with each other. The shape of the pattern PT-d may correspond to a shape obtained by rotating the adjacent pattern PT-d1 engaged with and connected to the pattern PT-d by 120 degrees.

Figure 6E:
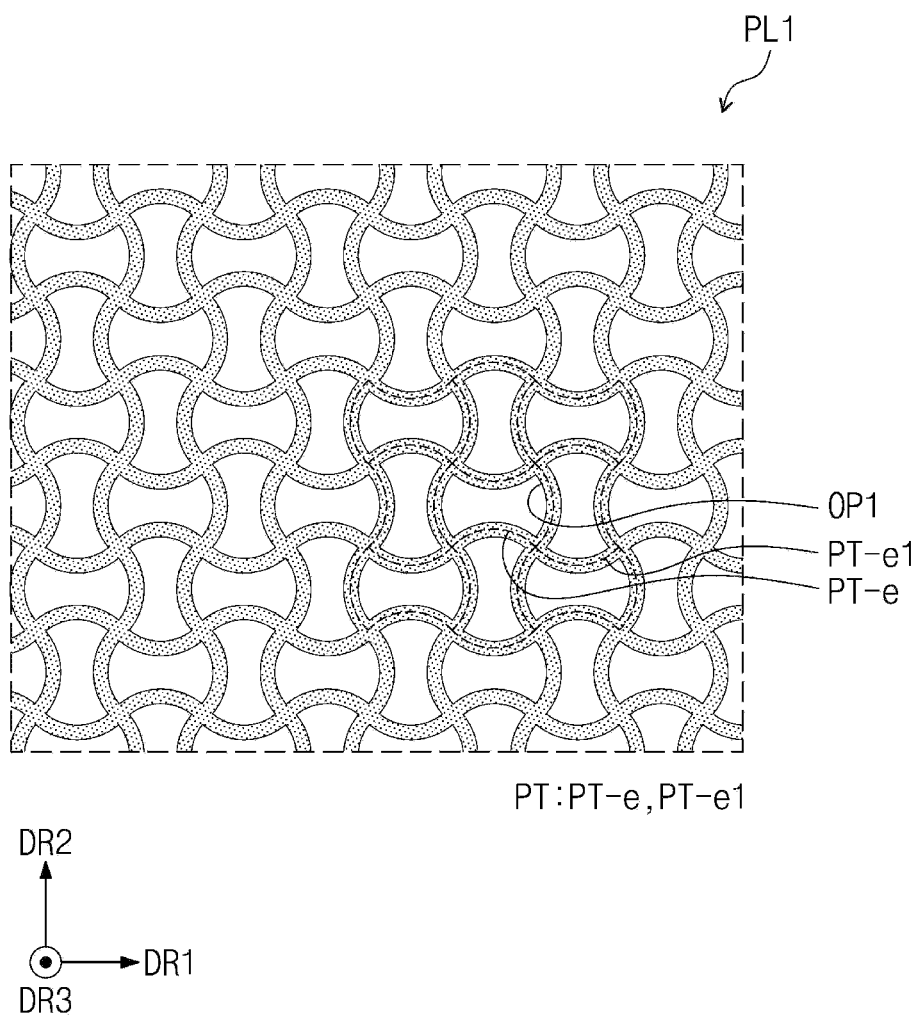
Figure 6F:
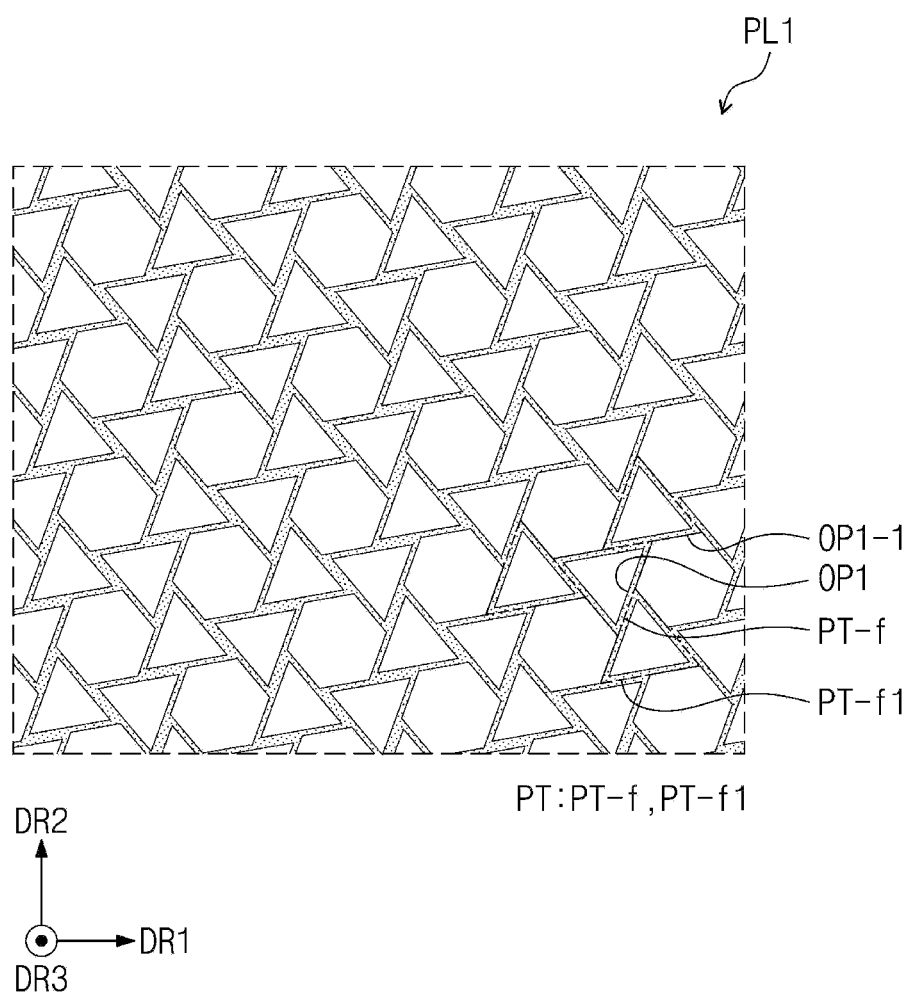

Referring to FIG. 6E, a pattern PT-e may include curves. The pattern PT-e may include curves which are convex along a direction opposite to the center of a first opening OP1 and curves which are concave toward the center of the first opening OP1. The pattern PT-e may have a shape similar to a ribbon on a plane. According to some embodiments of the inventive concept, the pattern PT-e may be connected to four adjacent patterns PT-e1 in a manner in which the curves thereof are engaged with each other. The shape of the pattern PT-e may correspond to a shape obtained by rotating the adjacent pattern PT-e1 engaged with and connected to the pattern PT-e by 90 degrees.

Referring to FIG. 6F, a pattern PT-f may have a polygonal shape. For example, the pattern PT-f may have an equilateral triangle shape on a plane. The pattern PT-f may be connected to patterns PF-f1 located adjacent thereto in a manner in which the sides thereof are partially engaged with each other. According to some embodiments of the inventive concept, the pattern PT-f may be connected to three adjacent patterns PT-f1 in a manner in which the sides thereof are engaged with each other. The shape of the pattern PT-f may correspond to a shape obtained by rotating the adjacent pattern PT-f1 engaged with and connected to the pattern PT-f by 180 degrees. The patterns PT connected to each other may define an opening OP1-1 adjacent to a first opening OP1 and having a hexagonal shape. However, the shape of the opening OP1-1 is not limited thereto.

Meanwhile, FIGS. 6A to 6F illustrate the shapes of the patterns PT having an auxetic structure which has a negative Poisson's ratio close to 0, and the shapes of the patterns PT of the first pattern layer PL1 are not limited thereto.

Figure 7A:
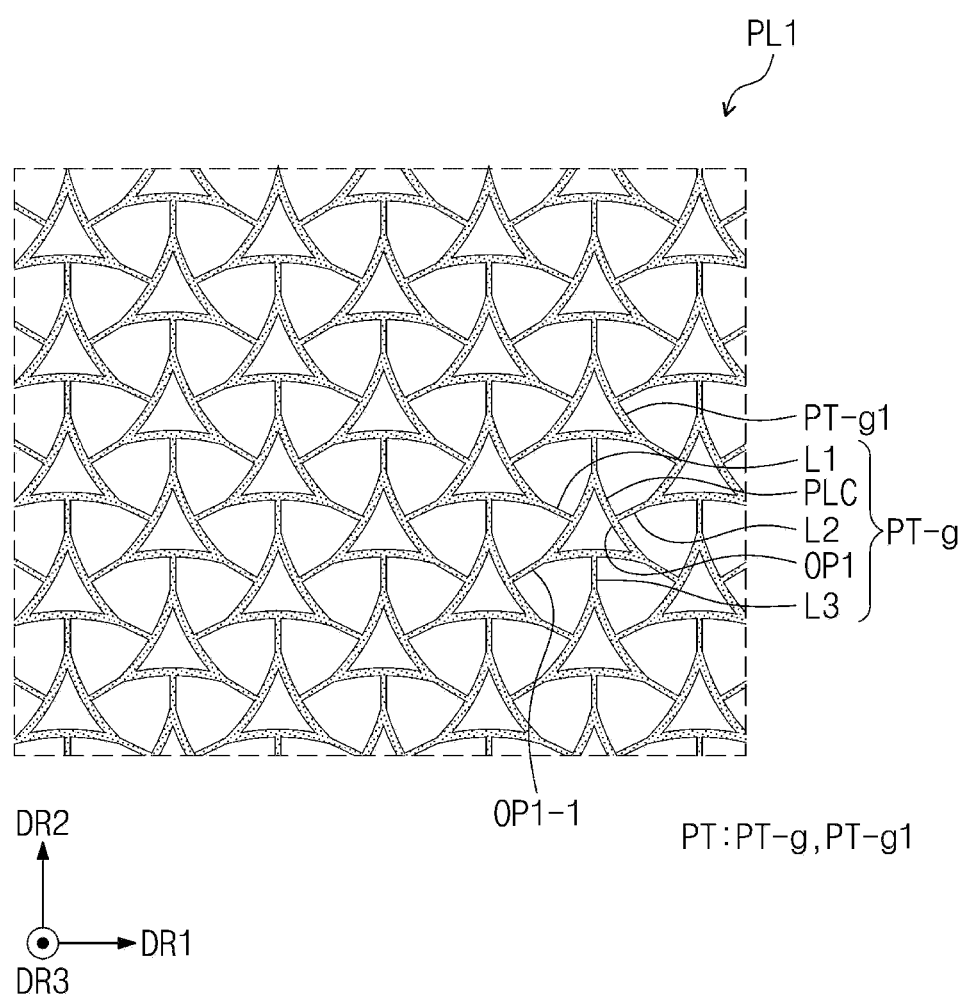
FIGS. 7A to 7C are plan views of a pattern layer according to some embodiments of the present invention.
Figure 7B:
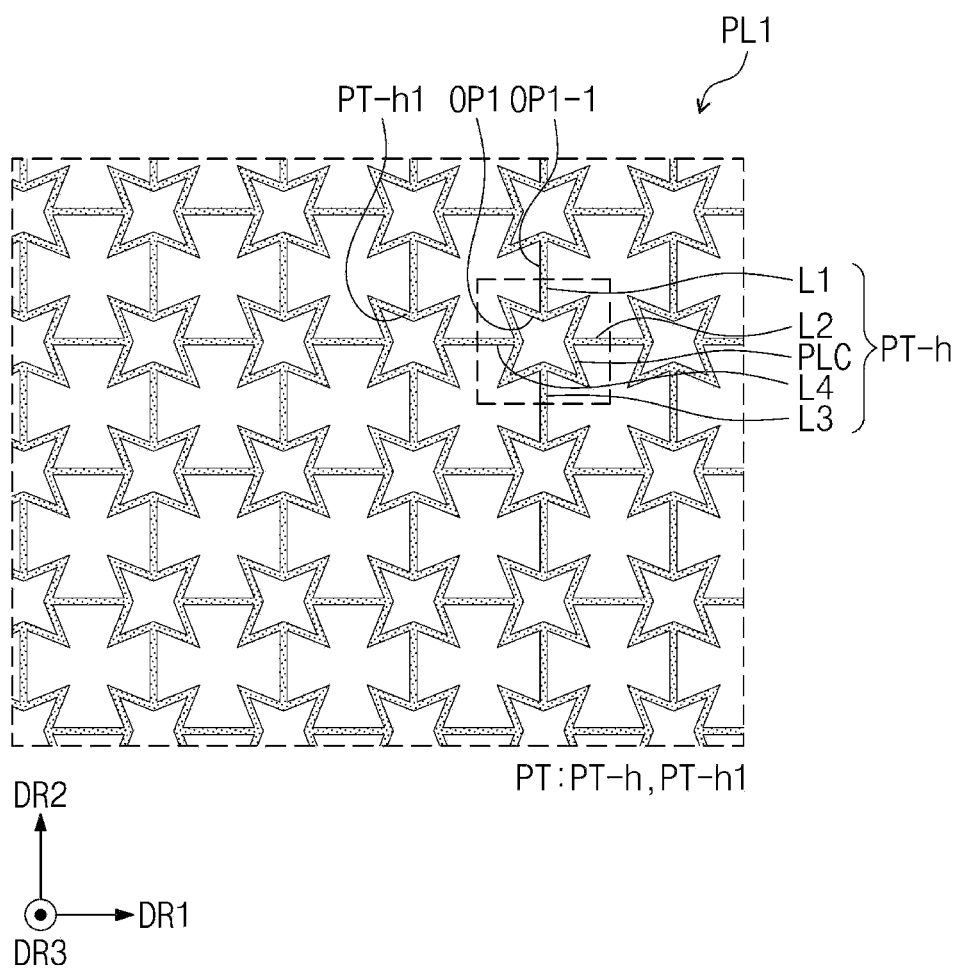
Figure 7C:
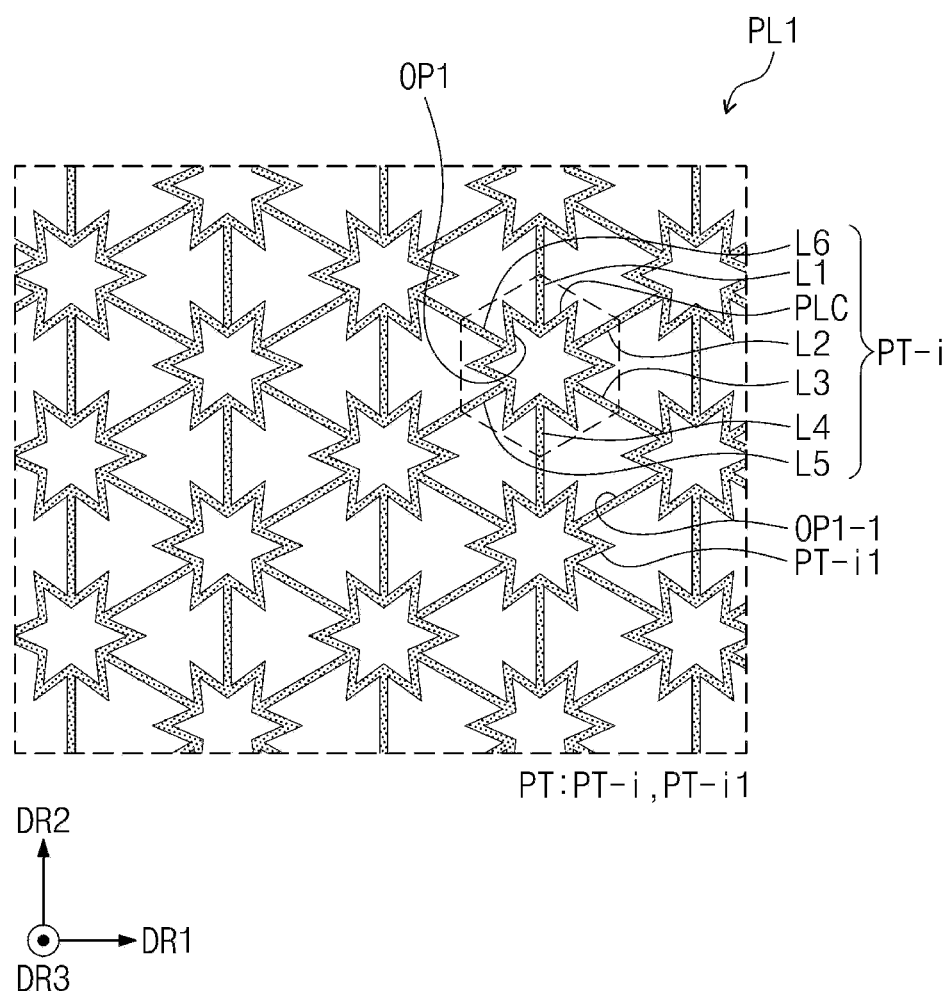

Referring to FIGS. 7A to 7C, each of the patterns PT of the first pattern layer PL1 may include a closed line pattern and line portions extending in a direction (e.g., a set or predetermined direction) from the closed line pattern on a plane. The closed line pattern may have various shapes including straight or curved sides, and in this specification, the closed line pattern may be referred to as a polygonal pattern. The line portions may respectively extend in a direction (e.g., a set or predetermined direction) from points at which the line portions come in contact with the sides of the closed line pattern.

Each of the patterns PT may include a first opening OP1 surrounded by the closed line pattern. That is, the first pattern layer PL1 may include first openings OP1 surrounded by the closed line patterns, respectively. Adjacent patterns PT may be connected to each other by line portions, and openings OP1-1, which are adjacent to the first opening OP1 and surrounded by the line portions and the closed line patterns, may be defined by the patterns PT which are connected to each other. As the first pattern layer PL1 includes the first opening OP1 and the openings OP1-1, flexibility of the first pattern layer PL1 may be improved.

When a tensile force is applied to the first pattern layer PL1, the tensile force may be dispersed between the closed line patterns and the line portions which are connected to each other. Accordingly, the impact resistance of the first pattern layer PL1 may be improved.

Hereinafter, the shapes of the patterns PT will be described based on one pattern located in the central region among the patterns PT illustrated in FIGS. 7A to 7C and the patterns located adjacent and connected thereto.

Referring to FIG. 7A, a pattern PT-g may include a closed line pattern PLC having a triangular shape including concave curved sides and first to third line portions L1, L2, and L3 extending from the closed line pattern PLC. As the closed line pattern PLC includes a curve, a tensile force applied to the first pattern layer PL1 may be well dispersed.

Each of the first to third line portions L1, L2, and L3 may extend from the center of the concave curved sides. The first to third line portions L1, L2, and L3 may extend along directions crossing each other, respectively. The first to third line portions L1, L2, and L3 may be respectively connected to the vertices of adjacent patterns PT-g1. Accordingly, each of the vertices of the pattern PT-g may be connected to the line portions of the adjacent patterns PT-g1.

Referring to FIGS. 7B and 7C, the closed line pattern PLC may have a polygonal shape having straight sides. For example, the closed line pattern PLC may have a star shape having four vertices as illustrated in FIG. 7B or a star shape having six vertices as illustrated in FIG. 7C. As the closed line pattern PLC has a polygonal shape, a tensile force may be well dispersed in various directions.

Referring to FIG. 7B, a pattern PT-h may include first to fourth line portions L1, L2, L3, and L4 extending from the closed line pattern PLC. Each of the first to fourth line portions L1, L2, L3, and L4 may extend from the concave points of the closed line pattern PLC toward the center of the first opening OP1. The first line portion L1 may extend along a direction crossing the extension direction of the second line portion L2. The first line portion L1 may extend in a direction opposite to the extension direction of the third line portion L3. The second line portion L2 may extend in a direction opposite to the extension direction of the fourth line portion L4.

Referring to FIG. 7C, a pattern PT-i may include first to sixth line portions L1, L2, L3, L4, L5, and L6 extending from the closed line pattern PLC. Each of the first to sixth line portions L1, L2, L3, L4, L5, and L6 may extend from the concave points of the closed line pattern PLC toward the center of the first opening OP1. The first line portion L1 may extend along a direction crossing each of the extension direction of the second line portion L2 and the extension direction of the third line portion L3. The first line portion L1 may extend in a direction opposite to the extension direction of the fourth line portion L4. The second line portion L2 may extend along a direction opposite to the extension direction of the fifth line portion L5, and the third line portion L3 may extend along a direction opposite to the extension direction of the sixth line portion L6.

As the patterns PT of the first pattern layer PL1 include the line portions extending from the concave point of the closed line pattern PLC, a tensile force applied to the first pattern layer PL1 may be well dispersed.

Meanwhile, FIGS. 7A to 7C illustrate the shapes of the patterns PT having an auxetic structure which has a negative Poisson's ratio close to 0, and the shapes of the patterns PT of the first pattern layer PL1 are not limited thereto.

Figure 8A:
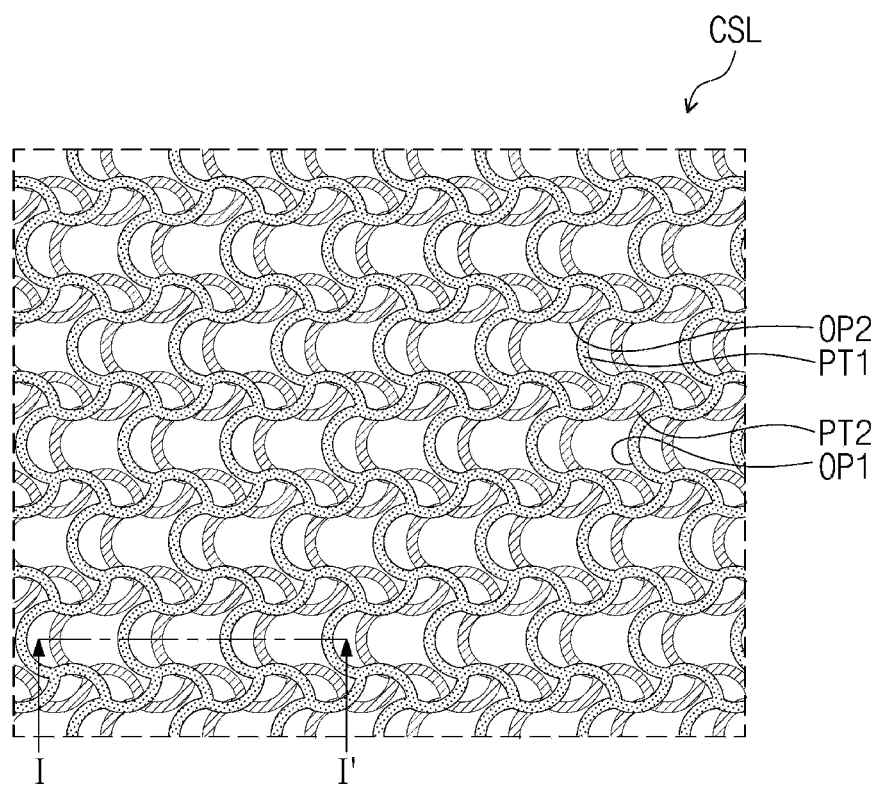
FIGS. 8A and 8B are plan views of a protective member according to some embodiments of the inventive concept.
Figure 8A:
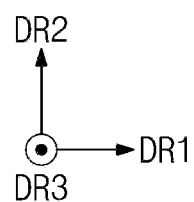
Figure 8B:
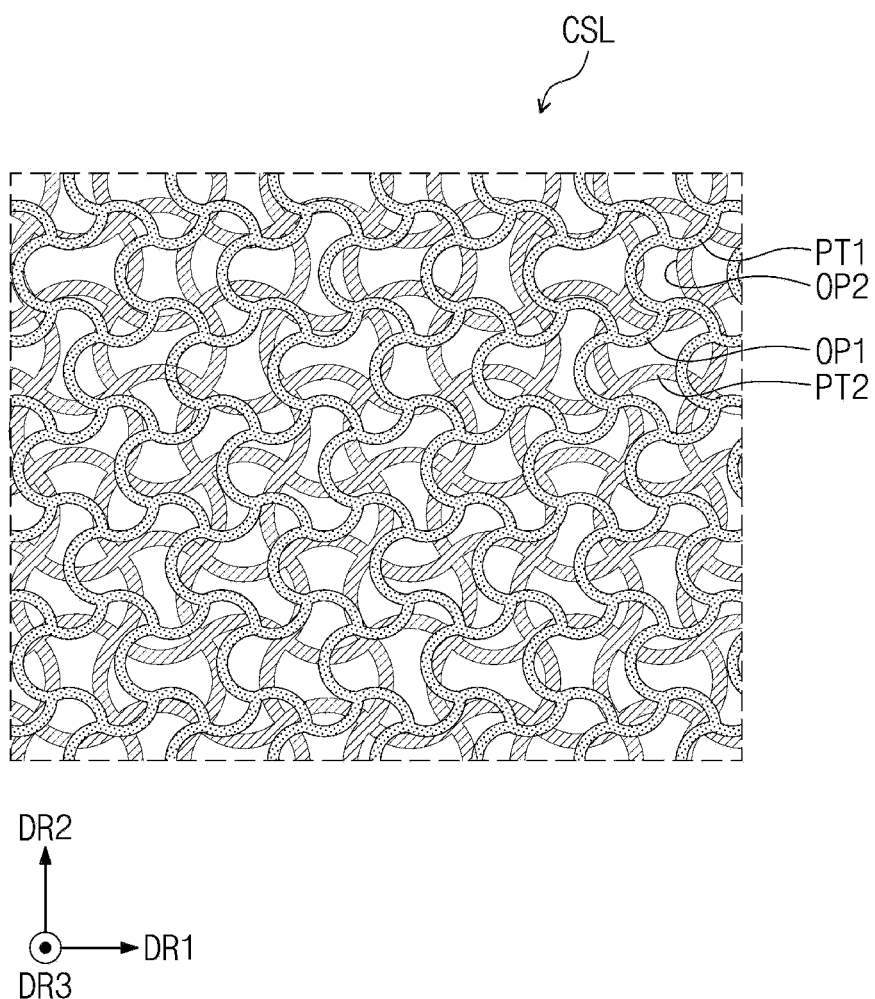

FIGS. 8A and 8B are plan views of a protective member according to some embodiments of the inventive concept. FIGS. 8A and 8B illustrate the embodiments of the first and second pattern layers PL1 and PL2 (refer to FIG. 5) arranged to overlap each other, and the aforementioned description may be equally applied to the first and second pattern layers PL1 and PL2 (refer to FIG. 5).

Referring to FIGS. 8A and 8B, first patterns PT1 and second patterns PT2 may form different layers and be arranged in different layers. On a plane, the first patterns PT1 and the second patterns PT2 may overlap each other. The aforementioned description of the patterns PT may be equally applied to the first and second patterns PT1 and PT2.

Referring to FIG. 8A, the first patterns PT1 may have the same shape and size as the second patterns PT2. However, the embodiments of the inventive concept are not limited thereto, and the first patterns PT1 may have the same shape as the second patterns PT2, but may have a size different from that of the second patterns PT2. FIG. 8A illustrates that the first patterns PT1 and the second patterns PT2 have the shapes of the patterns PT illustrated in FIG. 6A, respectively.

The first patterns PT1 may be arranged to be displaced from the second patterns PT2 on a plane. For example, as illustrated in FIG. 8A, the second patterns PT2 may correspond to the first patterns PT1 shifted along the first direction DR1. That is, first openings OP1 and second openings OP2 may have the same area and shape as each other, and on a plane, the centers of the first openings OP1 may be respectively arranged to be displaced from the centers of the second openings OP2. As long as the first patterns PT1 and the second patterns PT2 can be arranged to be displaced from each other, the shapes of the patterns are not limited to those illustrated in FIG. 8A.

As the first patterns PT1 and the second patterns PT2 are arranged to be displaced from each other, the first openings OP1 may overlap the second patterns PT2 on a plane. Likewise, the second openings OP2 may overlap the first patterns PT1 on a plane. Accordingly, the aperture ratios of the first pattern layer PL1 and the second pattern layer PL2 on a plane may be reduced.

When the shapes of the first patterns PT1 and the second patterns PT2 are arranged to coincide with each other on a plane (or in a plan view), the first openings OP1 may coincide with the second openings OP2 on a plane, respectively. Accordingly, the impact resistance of the protective member may be deteriorated in regions corresponding to the first and second openings OP1 and OP2. However, as the first patterns PT1 and the second patterns PT2 are arranged to be displaced from each other, the first and second openings OP1 and OP2 may be positioned to be displaced from each other on a plane. Accordingly, a phenomenon of deterioration in impact resistance by the first and second openings OP1 and OP2 may be compensated, and the impact resistance of the protective member CSL may be improved.

Referring to FIG. 8B, the first patterns PT1 and the second patterns PT2 may be arranged to be displaced from each other by having different shapes. FIG. 8B illustrates that the first patterns PT1 have the shapes of the patterns PT illustrated in FIG. 6A and the second patterns PT2 have the shapes of the patterns PT illustrated in FIG. 6E.

As the first patterns PT1 and the second patterns PT2 stacked along the thickness direction have different shapes, the first openings OP1 may overlap the second patterns PT2 on a plane. In addition, the second openings OP2 may overlap the first patterns PT1 on a plane. Accordingly, the aperture ratio of the protective member CSL on a plane may be substantially reduced, and the protective member CSL having improved impact resistance may be provided without deterioration in flexibility.

Figure 9A:
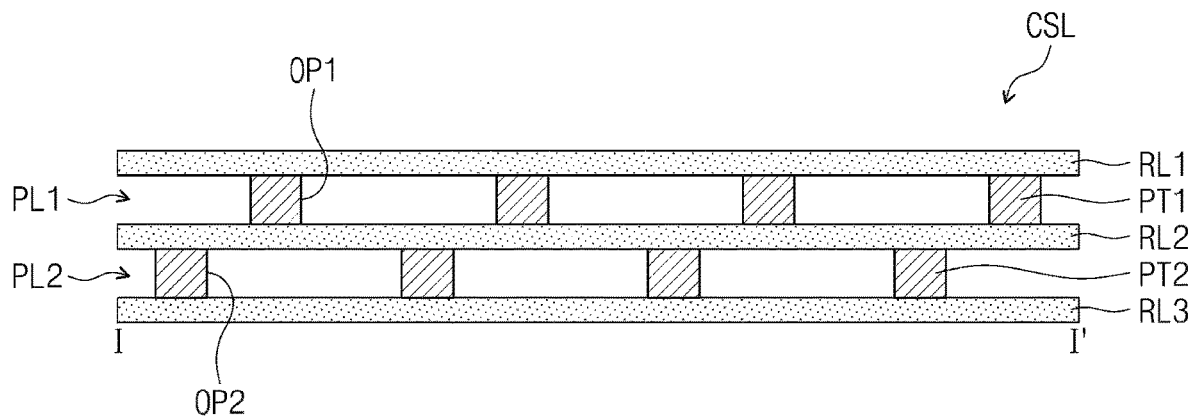
FIGS. 9A to 9C are cross-sectional views of a protective member according to some embodiments of the inventive concept.
Figure 9B:
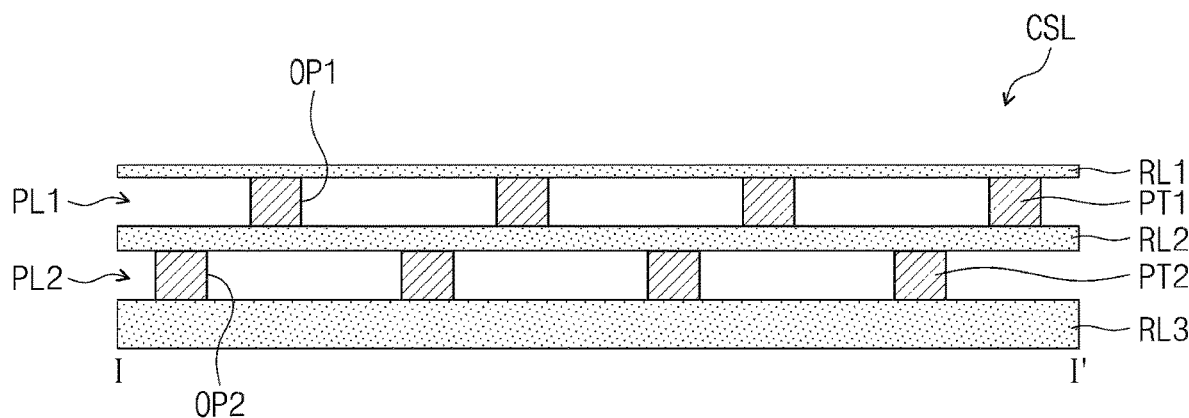
Figure 9C:
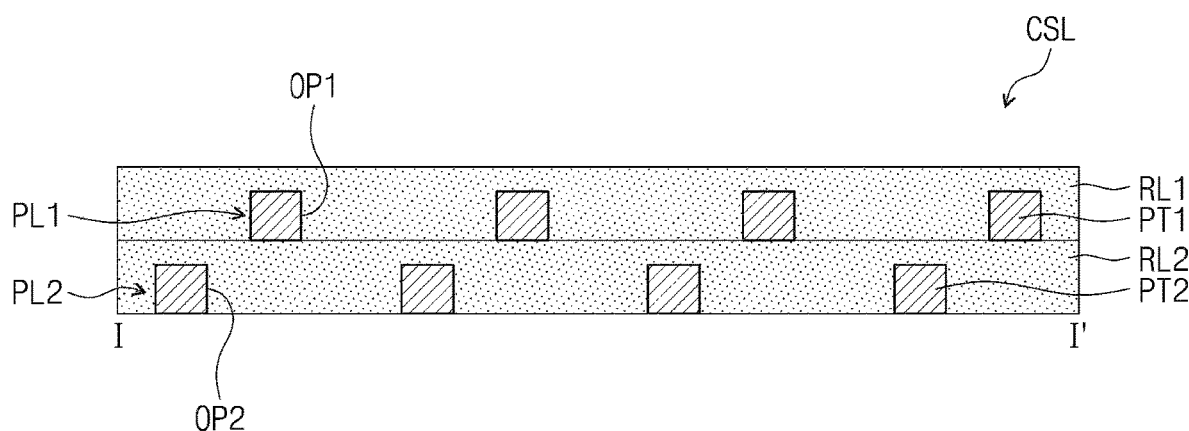

FIGS. 9A to 9C are cross-sectional views of a protective member according to some embodiments of the inventive concept. FIGS. 9A to 9C illustrate cross sections corresponding to line I-I' in FIG. 8A.

Referring to FIGS. 9A to 9C, the first patterns PT1 and the second patterns PT2 are arranged to be displaced from each other so that the second patterns PT2 may overlap the first openings OP1 and the first patterns PT1 may overlap the second openings OP2. In this way, the impact resistances of the first pattern layer PL1 and the second pattern layer PL2 may be supplemented, and the protective member CSL may have flexibility and improved impact resistance as well.

The protective member CSL may include at least one resin layer in contact with the pattern layers PL1 and PL2. FIGS. 9A and 9B illustrate a protection member CSL of some embodiments which include a first resin layer RL1 located on the first pattern layer PL1, a second resin layer RL2 located between the first pattern layer PL1 and the second pattern layer PL2, and a third resin layer RL3 located under the second pattern layer PL2. FIG. 9C illustrates a protective member CSL of some embodiments in which the third resin layer RL3 of FIG. 9A is omitted.

Each of the first to third resin layers RL1, RL2, and RL3 may contain a material having greater flexibility than the pattern layers PL1 and PL2. The modulus of each of the first to third resin layers RL1, RL2, and RL3 may be smaller than the modulus of each of the pattern layers PL1 and PL2. Each of the first to third resin layers RL1, RL2, and RL3 may contain a material having an elastic force (e.g., a set or predetermined elastic force). For example, each of the first to third resin layers RL1, RL2, and RL3 may contain polydimethylsiloxane (PDMS), thermoplastic polyurethane, butyl rubber, and the like. However, the materials of the first to third resin layers RL1, RL2, and RL3 are not limited to the above examples.

Referring to FIGS. 9A and 9B, the first resin layer RL1 and the second resin layer RL2 may be spaced apart from each other with the first pattern layer PL1 interposed therebetween. The second resin layer RL2 and the third resin layer RL3 may be spaced apart from each other with the second pattern layer PL2 interposed therebetween. That is, the inside of the first openings OP1 of the first pattern layer PL1 and the inside of the second openings OP2 of the second pattern layer PL2 may be provided as empty spaces.

Referring to FIG. 9A, the first to third resin layers RL1, RL2, and RL3 may have a same thickness. However, the embodiments of the inventive concept are not limited thereto, and referring to FIG. 9B, the first to third resin layers RL1, RL2, and RL3 may have different thicknesses. Among the first to third resin layers RL1, RL2, and RL3, the first resin layer RL1 may be a resin layer located closest to the display panel DP (refer to FIG. 3) to be located on the protective member CSL, and the third resin layer RL3 may be a resin layer arranged to be most spaced apart from the display panel DP (refer to FIG. 3). When a resin layer is further spaced apart from the display panel DP, the thickness of the resin layer may be greater. That is, the third resin layer RL3 may have the greatest thickness among the first to third resin layers RL1, RL2, and RL3. The thicknesses of the first to third resin layers RL1, RL2, and RL3 may be variously changed according to the mechanical properties required for the protective member CSL and are not limited to any one embodiment.

Referring to FIG. 9C, the first resin layer RL1 and the second resin layer RL2 may come in contact with each other. The first resin layer RL1 may entirely cover the first patterns PT1 of the first pattern layer PL1 and be located inside the first openings OP1. That is, the first resin layer RL1 may fill the inside of the first openings OP1. Likewise, the second resin layer RL2 may entirely cover the second patterns PT2 of the second pattern layer PL2 and be located inside the second openings OP2. As the first resin layer RL1 and the second resin layer RL2 fill the openings OP1 and OP2 of the pattern layers PL1 and PL2, the impact resistance of the protective member CSL may be improved.

The first resin layer RL1 and the second resin layer RL2 may be formed of a same material. According to some embodiments of the inventive concept, the first resin layer RL1 and the second resin layer RL2 may contain a same material and be integrally formed. However, the embodiments of the inventive concept are not necessarily limited thereto.

As the protective member CSL includes the resin layers RL1, RL2, and RL3, an external impact may be absorbed and the impact resistance of the protective member CSL may be improved. By having an elastic force (e.g., a set or predetermined elastic force), the resin layers RL1, RL2, and RL3 may control the mechanical deformation of the protective member CSL, which occurs in the thickness direction, minimize the denting of the upper surface of the protective member CSL, and reduce surface distortion.

The resin layers RL1, RL2, and RL3 may cover the step difference caused by the pattern layers PL1 and PL2 and provide a flat base surface to the display panel DP. Accordingly, the surface quality of the display panel DP located on the protective member CSL may be improved.

Figure 10A:
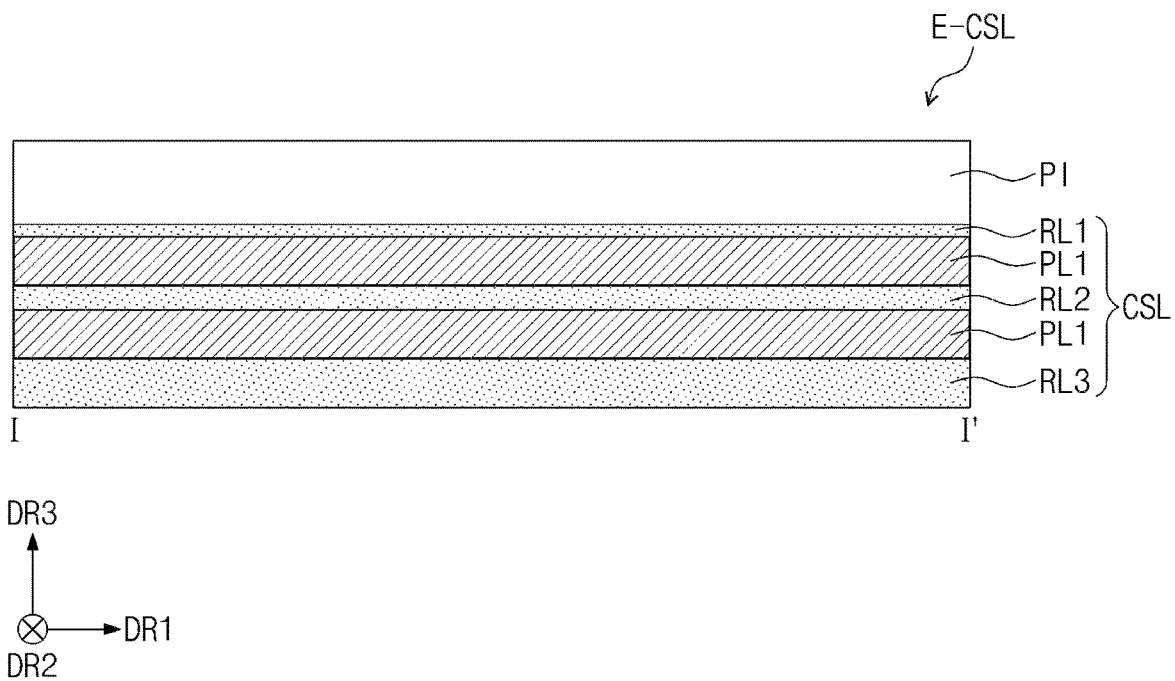
FIG. 10A is a cross-sectional view of a protective member according to some embodiments of the inventive concept; and 10B is a cross-sectional view of a protective member according to comparative embodiments of the inventive concept.
Figure 10B:
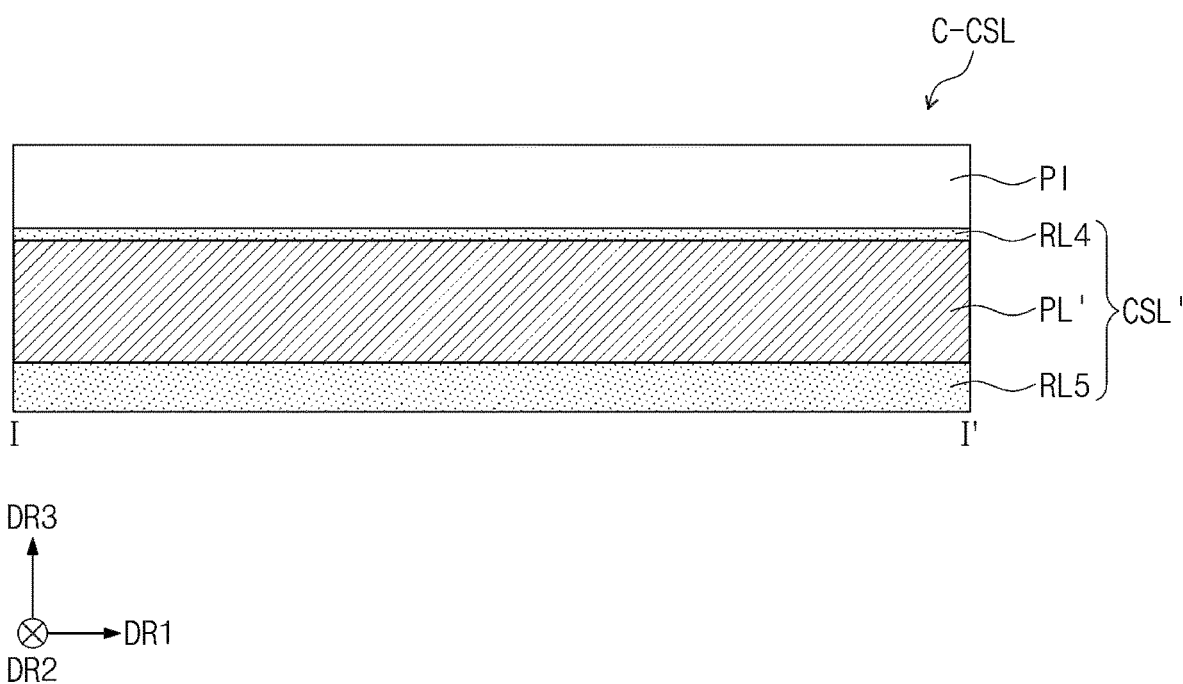

FIG. 10A is a cross-sectional view of a protective member according to some embodiments of the inventive concept, and FIG. 10B is a cross-sectional view of a protective member according to comparative embodiments of the inventive concept. FIGS. 10A and 10B illustrate cross sections of embodiments E-CSL and comparative embodiments C-CSL in which surface quality and impact resistance evaluations were performed, respectively.

Referring to FIG. 10A, the embodiments E-CSL includes a protective member CSL including first to third resin layers RL1, RL2, and RL3 and first and second pattern layers PL1 and PL2 which are alternately arranged with the first to third resin layers RL1, RL2, and RL3. Each of the first to third resin layers RL1, RL2, and RL3 includes polydimethylsiloxane (PDMS). The first to third resin layers RL1, RL2, and RL3 are provided with thicknesses of 5 micrometers, 10 micrometers, and 25 micrometers, respectively. The first pattern layer PL1 and the second pattern layer PL2 are provided as layers having patterns having the same shape as each other, and the patterns are arranged to be displaced from each other. Each of the first pattern layer PL1 and the second pattern layer PL2 is provided with a thickness of 30 micrometers.

Referring to FIG. 10B, the comparative embodiments C-CSL includes a protective member CSL' including fourth and fifth resin layers RL4 and RL5 and a single pattern layer PL' located between the fourth and fifth resin layers RL4 and RL5. In order to compare the surface quality and impact resistance of the pattern layers PL1 and PL2 of the embodiments E-CSL, the fourth and fifth resin layers RL4 and RL5 of the comparative embodiments C-CSL are respectively formed under the same conditions as the first and third resin layers RL1 and RL3 of the embodiments E-CSL. That is, each of the fourth and fifth resin layers RL4 and RL5 includes polydimethylsiloxane (PDMS). The fourth resin layer RL4 is provided with a thickness of 5 micrometers, and the fifth resin layer RL5 is provided with a thickness of 25 micrometers. The thickness of the single pattern layer PL' of the comparative embodiments C-CSL is greater than the sum of the thicknesses of the first and second pattern layers PL1 and PL2 of the embodiments E-CSL, and the thickness of the single pattern layer PL' is 80 micrometers.

On each of the protective members CSL and CSL' of the embodiments E-CSL and the comparative embodiments C-CSL, a polymer film PI which may correspond to the base substrate SUB (refer to FIG. 3) of the aforementioned display panel DP (refer to FIG. 3) is located. The polymer film PI includes a polyimide film, and the thickness thereof is 50 micrometers.

Table 1 shows the surface quality deterioration evaluation results and impact resistance evaluation results of the embodiments E-CSL of FIG. 10A and the comparative embodiments C-CSL of FIG. 10B, respectively. The surface quality deterioration evaluation results are obtained by measuring the step differences of wrinkles formed on the surfaces of the polymer films PI after rolling each of the embodiments E-CSL and the comparative embodiments C-CSL. The impact resistance evaluation results are obtained by measuring the degrees of dents on the upper surfaces of the polymer films PI after dropping a pen of a same condition on the polymer films PI of the embodiments E-CSL and the comparative embodiments C-CSL.

The surface quality deterioration evaluation result in Table 1 shows the degree of reduction in the surface step difference of the embodiments E-CSL in percentage (%) when the surface step difference of the comparative embodiments C-CSL before and after rolling is set as 100, and the result means that the greater the degree of reduction is, the more improved the surface quality is. The impact resistance evaluation result in Table 1 shows the degree of reduction in the value of dent of the embodiments E-CSL in percentage (%) when the value of dent on the surface of the comparative embodiments C-CSL is set as 100, and the result means that the greater the degree of reduction is, the more improved the impact resistance is.

TABLE 1

|  | Embodiments | Comparative embodiments |
|---|---|---|
| Surface quality deterioration evaluation | −9.63% | 100 |
| Impact resistance evaluation | −47.80% | 100 |

Referring to the surface quality deterioration evaluation results of Table 1, in the embodiments compared to the comparative embodiments, the step difference of the surface of the polyimide film located on the protective member before and after rolling may be reduced. That is, as the protective member of the embodiments includes a plurality of pattern layers having a small thickness compared to a single pattern layer having a relatively large thickness, flexibility may be improved and the surface quality of a component located on the protective member may be improved.

Referring to the impact resistance evaluation results of Table 1, in the embodiments compared to the comparative embodiments, the degree of damage caused by an external impact such as a pen drop may be reduced. That is, as a plurality of pattern layers stacked along the thickness direction supplement each other's impact resistances, the impact resistance of the protective member of the embodiments may be improved, and the protective member may withstand an external impact relatively well.

As the protective member according to some embodiments of the inventive concept includes pattern layers having a structure having a Poisson's ratio substantially close to 0, a tensile force caused by rolling may be well dispersed, and thus the surface quality of the display apparatus may be improved. In addition, as the patterns of a plurality of pattern layers are arranged to be displaced from each other, the aperture ratio of the pattern layers on a plane may be reduced, flexibility may be maintained due to the openings, and impact resistance may be improved as well. Accordingly, both the flexibility and impact resistance of the protective member may be improved.

By including a plurality of pattern layers having a Poisson's ratio close to 0 and a protective member configured to protect a display panel, the inventive concept may improve the surface quality of the display apparatus.

As the patterns of a plurality of pattern layers are arranged to be displaced from each other, the inventive concept may reduce the aperture ratio inside the plurality of pattern layers and therefore also improve both the flexibility and impact resistance of the display apparatus.

Although the above has been described with reference to some embodiments according to the inventive concept, those skilled in the art or those of ordinary skill in the art will understand that various modifications and changes can be made to the inventive concept within the scope that does not depart from the spirit and technical field of the inventive concept described in the claims to be described later. Accordingly, the technical scope of the inventive concept should not be limited to the content described in the detailed description of the specification, but should be determined by the claims as hereinafter described, and their equivalents.

What is claimed is:

1. A display apparatus comprising:
a display panel;
a first pattern layer on one surface of the display panel; and
a second pattern layer facing the one surface with the first pattern layer interposed therebetween,
wherein:
the first pattern layer comprises a plurality of first patterns each having a closed line shape comprising a first opening;
the second pattern layer comprises a plurality of second patterns each having a closed line shape comprising a second opening;
on the one surface, each of the first pattern layer and the second pattern layer has a deformation rate which is smaller in a direction perpendicular to a tensile direction than in the tensile direction; and
on the one surface, the first openings overlap portions of the second patterns.

2. The display apparatus of claim 1, wherein each of the first pattern layer and the second pattern layer has a negative Poisson's ratio.

3. The display apparatus of claim 1, wherein the first patterns have a shape different from that of the second patterns.

4. The display apparatus of claim 1, wherein the first patterns have a same shape as the second patterns.

5. The display apparatus of claim 1, wherein each of the first patterns is engaged with and connected to adjacent first patterns.

6. The display apparatus of claim 5, wherein a portion in which the first patterns are engaged with each other includes a curve.

7. The display apparatus of claim 5, wherein shapes of the first patterns that are engaged with and connected to each other are identical to each other.

8. The display apparatus of claim 5, wherein a shape of one of the first patterns engaged with and connected to each other corresponds to a shape obtained by rotating a first pattern connected to the one first pattern at a predetermined angle.

9. The display apparatus of claim 1, wherein:
the first patterns comprise a polygonal pattern and line portions extending from the polygonal pattern; and
the first patterns adjacent to each other are connected by the line portions of the first patterns.

10. The display apparatus of claim 1, further comprising:
a first resin layer between the first pattern layer and the display panel; and
a second resin layer between the first pattern layer and the second pattern layer.

11. The display apparatus of claim 10, wherein a modulus of each of the first pattern layer and the second pattern layer is greater than a modulus of each of the first resin layer and the second resin layer.

12. The display apparatus of claim 10, wherein:
the first resin layer is inside the first openings; and
the second resin layer is inside the second openings.

13. The display apparatus of claim 10, wherein the first resin layer is spaced apart from the second pattern layer with the first pattern layer interposed therebetween.

14. The display apparatus of claim 1, further comprising a plurality of support bars, which face the one surface of the display panel with the first and second pattern layers interposed therebetween, are arranged in one direction, and respectively extend in a direction crossing the one direction.

15. A display apparatus comprising:
a display panel that is rolled around a rolling axis; and
a protective member on one surface of the display panel, wherein:
the protective member comprises a plurality of pattern layers arranged along a thickness direction of the display panel and respectively comprising auxetic patterns; and
the auxetic patterns of at least two of the plurality of pattern layers are displaced from each other on a plane.

16. The display apparatus of claim 15, wherein each of the plurality of pattern layers has a Poisson's ratio of 0.3 or less.

17. The display apparatus of claim 15, wherein the auxetic patterns of the plurality of pattern layers have a same shape as each other.

18. The display apparatus of claim 15, wherein the auxetic patterns of at least two of the plurality of pattern layers have shapes different from each other.

19. The display apparatus of claim 15, wherein the protective member further comprises at least one resin layer alternately arranged with the plurality of pattern layers.

20. The display apparatus of claim 19, wherein a modulus of each of the plurality of pattern layers is greater than a modulus of the at least one resin layer.

* * * * *